US011851770B2

(12) United States Patent
Gold et al.

(10) Patent No.: US 11,851,770 B2
(45) Date of Patent: Dec. 26, 2023

(54) THERMAL BARRIER COATINGS FOR COMPONENTS IN HIGH-TEMPERATURE MECHANICAL SYSTEMS

(71) Applicants: Rolls-Royce Corporation, Indianapolis, IN (US); Rolls-Royce North American Technologies, Inc., Indianapolis, IN (US)

(72) Inventors: Matthew R. Gold, Carmel, IN (US); Michael Cybulsky, Indianapolis, IN (US); Stephanie Gong, Indianapolis, IN (US); Li Li, Carmel, IN (US)

(73) Assignees: Rolls-Royce Corporation, Indianapolis, IN (US); Rolls-Royce North American Technologies, Inc., Indianapolis, IN (US)

( * ) Notice: Subject to any disclaimer, the term of this patent is extended or adjusted under 35 U.S.C. 154(b) by 627 days.

(21) Appl. No.: 17/002,203

(22) Filed: Aug. 25, 2020

(65) Prior Publication Data
US 2020/0385871 A1 Dec. 10, 2020

Related U.S. Application Data

(62) Division of application No. 16/034,801, filed on Jul. 13, 2018, now abandoned.

(60) Provisional application No. 62/533,422, filed on Jul. 17, 2017.

(51) Int. Cl.
| | |
|---|---|
| *C23C 28/04* | (2006.01) |
| *C23C 4/11* | (2016.01) |
| *C23C 4/134* | (2016.01) |
| *F01D 5/28* | (2006.01) |
| *C23C 28/00* | (2006.01) |
| *C04B 41/87* | (2006.01) |
| *C04B 41/50* | (2006.01) |
| *C04B 41/00* | (2006.01) |
| *C23C 4/073* | (2016.01) |
| *B32B 18/00* | (2006.01) |
| *C23C 24/08* | (2006.01) |
| *C04B 111/00* | (2006.01) |
| *B32B 15/16* | (2006.01) |

(52) U.S. Cl.
CPC ............ *C23C 28/042* (2013.01); *B32B 18/00* (2013.01); *C04B 41/009* (2013.01); *C04B 41/5042* (2013.01); *C04B 41/87* (2013.01); *C23C 4/073* (2016.01); *C23C 4/11* (2016.01); *C23C 4/134* (2016.01); *C23C 24/08* (2013.01); *C23C 28/3215* (2013.01); *C23C 28/345* (2013.01); *C23C 28/3455* (2013.01); *F01D 5/288* (2013.01); *B32B 15/16* (2013.01); *C04B 2111/0025* (2013.01); *C04B 2111/00577* (2013.01); *C04B 2235/3224* (2013.01); *C04B 2235/5436* (2013.01); *C04B 2235/5445* (2013.01); *C04B 2235/76* (2013.01); *C04B 2237/343* (2013.01); *C04B 2237/348* (2013.01); *C04B 2237/586* (2013.01); *C04B 2237/588* (2013.01); *C04B 2237/704* (2013.01); *F05D 2230/312* (2013.01); *F05D 2230/90* (2013.01); *F05D 2300/15* (2013.01); *F05D 2300/2112* (2013.01); *F05D 2300/2118* (2013.01)

(58) Field of Classification Search
CPC .................................. C23C 4/11; C23C 4/134
See application file for complete search history.

(56) References Cited

U.S. PATENT DOCUMENTS

| | | | |
|---|---|---|---|
| 3,962,059 A | 6/1976 | Kaup et al. | |
| 3,964,877 A | 6/1976 | Bessen et al. | |
| 4,094,673 A | 6/1978 | Erickson et al. | |
| 4,386,968 A | 6/1983 | Hinkel et al. | |
| 4,588,607 A | 5/1986 | Matarese et al. | |
| 4,663,250 A | 5/1987 | Ong et al. | |
| 4,914,794 A | 4/1990 | Strangman | |
| 4,996,117 A | 2/1991 | Chu | |
| 5,087,477 A | 2/1992 | Giggins, Jr. et al. | |
| 5,320,909 A | 6/1994 | Scharman et al. | |

(Continued)

FOREIGN PATENT DOCUMENTS

| | | | |
|---|---|---|---|
| CA | 2712248 A1 | 9/2012 | |
| EP | 0972853 A1 | 1/2000 | |

(Continued)

OTHER PUBLICATIONS

Kassner, Application of Suspension Plasma Spraying (SPS) for Manufacture of Ceramic Coatings, Journal of Thermal Spray Technology, vol. 17(1), Mar. 2008, p. 115-123 (Year: 2008).*

(Continued)

*Primary Examiner* — Tabatha L Penny
(74) *Attorney, Agent, or Firm* — Shumaker & Sieffert, P.A.

(57) ABSTRACT

An article that includes a substrate; a first layer including yttria and zirconia or hafnia, where the first layer has a columnar microstructure and includes predominately the zirconia or hafnia; a second layer on the first layer, the second layer including zirconia or hafnia, ytterbia, samaria, and at least one of lutetia, scandia, ceria, neodymia, europia, and gadolinia, where the second layer includes predominately zirconia or hafnia, and where the second layer has a columnar microstructure; and a third layer on the second layer, the third layer including zirconia or hafnia, ytterbia, samaria, and a rare earth oxide including at least one of lutetia, scandia, ceria, neodymia, europia, and gadolinia, where the third layer has a dense microstructure and has a lower porosity than the second layer.

16 Claims, 5 Drawing Sheets

(56) References Cited

U.S. PATENT DOCUMENTS

| | | |
|---|---|---|
| 5,350,599 A | 9/1994 | Rigney et al. |
| 5,391,404 A | 2/1995 | Lee et al. |
| 5,496,644 A | 3/1996 | Lee et al. |
| 5,660,885 A | 8/1997 | Hasz et al. |
| 5,714,202 A | 2/1998 | Lemelson et al. |
| 5,704,759 A | 6/1998 | Draskovich et al. |
| 5,773,141 A | 6/1998 | Hasz et al. |
| 5,851,678 A | 12/1998 | Hasz et al. |
| 5,869,146 A | 2/1999 | McCluskey et al. |
| 5,871,820 A | 2/1999 | Hasz et al. |
| 5,876,850 A | 3/1999 | Skowronski et al. |
| 5,876,860 A | 3/1999 | Marijnissen et al. |
| 5,914,189 A | 6/1999 | Hasz et al. |
| 5,985,470 A | 11/1999 | Spitsberg et al. |
| 6,057,047 A | 5/2000 | Maloney |
| 6,261,643 B1 | 7/2001 | Hasz et al. |
| 6,284,325 B1 | 9/2001 | Eaton, Jr. et al. |
| 6,296,942 B1 | 10/2001 | Eaton et al. |
| 6,299,988 B1 | 10/2001 | Wang et al. |
| 6,312,763 B1 | 11/2001 | Eaton, Jr. et al. |
| 6,410,148 B1 | 6/2002 | Eaton, Jr. et al. |
| 6,465,090 B1 | 10/2002 | Stowell et al. |
| 6,468,648 B1 | 10/2002 | McCluskey et al. |
| 6,485,848 B1 | 11/2002 | Wang et al. |
| 6,562,409 B2 | 5/2003 | Koshkarian et al. |
| 6,613,445 B2 | 9/2003 | Sangeeta et al. |
| 6,617,036 B2 | 9/2003 | Eaton et al. |
| 6,627,323 B2 | 9/2003 | Nagaraj et al. |
| 6,720,038 B2 | 4/2004 | Darolia et al. |
| 6,723,674 B2 | 4/2004 | Wang et al. |
| 6,733,908 B1 | 5/2004 | Lee et al. |
| 6,759,151 B1 | 7/2004 | Lee |
| 6,787,195 B2 | 9/2004 | Wang et al. |
| 6,812,176 B1 | 11/2004 | Zhu et al. |
| 6,835,465 B2 | 12/2004 | Allen et al. |
| 6,869,508 B2 | 3/2005 | Darolia et al. |
| 6,887,528 B2 | 5/2005 | Lau et al. |
| 6,887,595 B1 | 5/2005 | Darolia et al. |
| 6,890,668 B2 | 5/2005 | Bruce et al. |
| 6,893,750 B2 | 5/2005 | Nagaraj et al. |
| 6,902,662 B2 | 6/2005 | Eaton et al. |
| 6,902,836 B2 | 6/2005 | Eaton et al. |
| 6,933,061 B2 | 8/2005 | Nagaraj et al. |
| 6,933,066 B2 | 8/2005 | Nagaraj et al. |
| 6,960,395 B2 | 11/2005 | Spitsberg et al. |
| 6,969,555 B2 | 11/2005 | Meschter et al. |
| 7,008,674 B2 | 3/2006 | Nagaraj et al. |
| 7,063,894 B2 | 6/2006 | Nagashima et al. |
| 7,090,894 B2 | 8/2006 | Carper et al. |
| 7,186,466 B2 | 3/2007 | Zhu et al. |
| 7,226,668 B2 | 6/2007 | Nagaraj et al. |
| 7,354,651 B2 | 4/2008 | Hazel et al. |
| 7,364,802 B2 | 4/2008 | Spitsberg et al. |
| 7,374,818 B2 | 5/2008 | Bhatia et al. |
| 7,374,825 B2 | 5/2008 | Hazel et al. |
| 7,442,444 B2 | 10/2008 | Hazel et al. |
| 7,449,254 B2 | 11/2008 | Spitsberg et al. |
| 7,544,394 B2 | 6/2009 | Boutwell et al. |
| 7,579,085 B2 | 8/2009 | Hazel |
| 7,595,114 B2 | 9/2009 | Meschter et al. |
| 7,666,512 B2 | 2/2010 | Bhatia et al. |
| 7,695,830 B2 | 4/2010 | Strangman et al. |
| 7,740,960 B1 | 6/2010 | Zhu et al. |
| 7,867,575 B2 | 1/2011 | Boutwell et al. |
| 7,879,411 B2 | 2/2011 | Hass et al. |
| 7,951,459 B2 | 5/2011 | Tang et al. |
| 7,968,217 B2 | 6/2011 | Sarrafi-Nour et al. |
| 8,084,086 B2 | 12/2011 | Hass et al. |
| 8,119,247 B2 | 2/2012 | Kirby et al. |
| 8,124,252 B2 | 2/2012 | Cybulsky et al. |
| 8,470,460 B2 | 6/2013 | Lee |
| 9,194,242 B2 | 11/2015 | Lee |
| 2001/0033630 A1 | 10/2001 | Hassoun et al. |
| 2002/0098391 A1 | 7/2002 | Tanaka et al. |
| 2003/0113553 A1 | 6/2003 | Sun et al. |
| 2003/0113559 A1 | 6/2003 | Eaton et al. |
| 2003/0118841 A1 | 6/2003 | Horne et al. |
| 2003/0138658 A1 | 7/2003 | Taylor et al. |
| 2004/0038085 A1 | 2/2004 | Litton et al. |
| 2004/0043244 A1 | 3/2004 | Bruce et al. |
| 2004/0115351 A1 | 6/2004 | Lau et al. |
| 2004/0151840 A1 | 8/2004 | Wang et al. |
| 2004/0170849 A1 | 9/2004 | Ackerman et al. |
| 2005/0003172 A1 | 1/2005 | Wheeler et al. |
| 2005/0003175 A1 | 1/2005 | Wheeler et al. |
| 2005/0126494 A1 | 6/2005 | Darolia et al. |
| 2005/0129511 A1 | 6/2005 | Allen |
| 2005/0129973 A1 | 6/2005 | Eaton et al. |
| 2005/0142392 A1 | 6/2005 | Spitsberg et al. |
| 2005/0164027 A1 | 7/2005 | Lau et al. |
| 2005/0255648 A1 | 11/2005 | Bhatia et al. |
| 2006/0014029 A1 | 1/2006 | Saak et al. |
| 2006/0024513 A1 | 2/2006 | Schlichting et al. |
| 2006/0024527 A1 | 2/2006 | Schlichting et al. |
| 2006/0024528 A1 | 2/2006 | Strangman et al. |
| 2006/0029733 A1 | 2/2006 | Bhatia et al. |
| 2006/0046450 A1 | 3/2006 | Narendar et al. |
| 2006/0073361 A1 | 4/2006 | Fukudome et al. |
| 2006/0078750 A1 | 4/2006 | Zhu et al. |
| 2006/0115659 A1 | 6/2006 | Hazel et al. |
| 2006/0115661 A1 | 6/2006 | Hazel et al. |
| 2006/0154093 A1 | 7/2006 | Meschter et al. |
| 2006/0166018 A1 | 7/2006 | Spitsberg et al. |
| 2006/0210800 A1 | 9/2006 | Spitsberg et al. |
| 2006/0211241 A1 | 9/2006 | Govern et al. |
| 2006/0222777 A1 | 10/2006 | Skoog et al. |
| 2006/0280952 A1 | 12/2006 | Hazel et al. |
| 2006/0280953 A1 | 12/2006 | Hazel et al. |
| 2006/0280954 A1 | 12/2006 | Spitsberg et al. |
| 2006/0280955 A1 | 12/2006 | Spitsberg et al. |
| 2006/0280963 A1 | 12/2006 | Hazel et al. |
| 2006/0289405 A1 | 12/2006 | Oberste-Berghaus |
| 2007/0014996 A1 | 1/2007 | Bhatia et al. |
| 2007/0071996 A1 | 3/2007 | Hazel et al. |
| 2007/0082131 A1 | 4/2007 | Doesberg et al. |
| 2007/0119713 A1 | 5/2007 | Hasz |
| 2007/0141367 A1 | 6/2007 | Darolia et al. |
| 2007/0160859 A1 | 7/2007 | Darolia et al. |
| 2007/0184204 A1 | 8/2007 | Balagopal et al. |
| 2007/0207330 A1 | 9/2007 | Tulyani et al. |
| 2007/0224411 A1 | 9/2007 | Hazel et al. |
| 2008/0124479 A1 | 5/2008 | Hazel et al. |
| 2008/0145674 A1 | 6/2008 | Darolia et al. |
| 2008/0206542 A1 | 8/2008 | Vance et al. |
| 2008/0274336 A1 | 11/2008 | Merrill et al. |
| 2009/0102008 A1 | 4/2009 | Kakehata |
| 2009/0110953 A1 | 4/2009 | Margolies |
| 2009/0162556 A1 | 6/2009 | Boutwell et al. |
| 2009/0162684 A1 | 6/2009 | Creech |
| 2009/0169914 A1 | 7/2009 | Fu et al. |
| 2009/0176059 A1 | 7/2009 | Namba et al. |
| 2009/0178413 A1 | 7/2009 | Lee |
| 2009/0184280 A1 | 7/2009 | Lee |
| 2009/0186237 A1* | 7/2009 | Lee ................ C23C 28/042<br>428/678 |
| 2009/0324930 A1 | 12/2009 | Tulyani et al. |
| 2010/0080984 A1 | 4/2010 | Lee |
| 2010/0129636 A1 | 5/2010 | Cybulsky et al. |
| 2010/0136349 A1* | 6/2010 | Lee ................ C04B 41/52<br>428/411.1 |
| 2010/0154422 A1 | 6/2010 | Kirby et al. |
| 2010/0159150 A1 | 6/2010 | Kirby et al. |
| 2010/0159253 A1 | 6/2010 | Kirby et al. |
| 2011/0027467 A1 | 2/2011 | Kirby et al. |
| 2011/0027469 A1 | 2/2011 | Kirby et al. |
| 2011/0027470 A1 | 2/2011 | Kirby et al. |
| 2011/0027476 A1 | 2/2011 | Kirby et al. |
| 2011/0027484 A1 | 2/2011 | Kirby et al. |
| 2011/0027517 A1 | 2/2011 | Kirby et al. |
| 2011/0027557 A1 | 2/2011 | Kirby et al. |
| 2011/0027558 A1 | 2/2011 | Kirby et al. |
| 2011/0027559 A1 | 2/2011 | Kirby et al. |
| 2011/0027578 A1 | 2/2011 | Kirby et al. |
| 2011/0033630 A1 | 2/2011 | Naik et al. |

(56) References Cited

U.S. PATENT DOCUMENTS

| | | |
|---|---|---|
| 2011/0111310 A1 | 5/2011 | Pastula et al. |
| 2011/0244216 A1 | 10/2011 | Meyer et al. |
| 2011/0256411 A1 | 10/2011 | Courcot et al. |
| 2012/0076943 A1 | 3/2012 | Kirby et al. |
| 2012/0077004 A1 | 3/2012 | Kirby et al. |
| 2012/0128879 A1 | 5/2012 | Cybulsky et al. |
| 2012/0244383 A1 | 9/2012 | Meschter et al. |
| 2013/0004309 A1 | 1/2013 | Sambasivan et al. |
| 2013/0101745 A1 | 4/2013 | Meillot et al. |
| 2013/0136915 A1 | 5/2013 | Naik |
| 2013/0189531 A1 | 7/2013 | Lee |
| 2013/0224453 A1 | 8/2013 | Hazel et al. |
| 2013/0224457 A1 | 8/2013 | Lee |
| 2014/0193760 A1 | 7/2014 | Nelson et al. |
| 2015/0140284 A1 | 5/2015 | Mantkowski et al. |
| 2015/0252464 A1 | 9/2015 | Hazel et al. |
| 2016/0068941 A1 | 3/2016 | Nair et al. |
| 2016/0108510 A1 | 4/2016 | Kirby et al. |
| 2016/0115819 A1 | 4/2016 | Nayak et al. |
| 2017/0016104 A1 | 1/2017 | Hazel et al. |
| 2019/0017177 A1 | 1/2019 | Gold et al. |

FOREIGN PATENT DOCUMENTS

| | | | |
|---|---|---|---|
| EP | 1335040 A2 | 8/2003 | |
| EP | 1400611 A1 | 3/2004 | |
| EP | 1479661 A2 | 11/2004 | |
| EP | 1626039 A2 | 2/2006 | |
| EP | 1666638 A1 | 6/2006 | |
| EP | 1795515 A2 | 6/2007 | |
| EP | 1806435 A2 | 7/2007 | |
| EP | 1829847 A2 | 9/2007 | |
| EP | 1806435 A3 | 4/2008 | |
| EP | 1975258 A1 | 10/2008 | |
| EP | 2108715 A2 | 10/2009 | |
| EP | 2189504 A1 | 5/2010 | |
| EP | 2192098 A2 | 6/2010 | |
| EP | 2194164 A1 | 6/2010 | |
| EP | 2208805 A1 | 7/2010 | |
| EP | 2245096 | 11/2010 | |
| EP | 2287131 A2 | 2/2011 | |
| EP | 2287138 A2 | 2/2011 | |
| EP | 2561110 A1 | 2/2013 | |
| EP | 2754727 A1 | 7/2014 | |
| EP | 3101152 A1 | 12/2016 | |
| EP | 2963141 B1 | 1/2017 | |
| GB | 2319248 A | 5/1998 | |
| SG | 163216 | 3/2013 | |
| WO | WO-0190438 A1 * | 11/2001 | ........... C23C 14/228 |
| WO | 2006023894 A2 | 3/2006 | |
| WO | 2007098152 A2 | 8/2007 | |
| WO | 2007116547 A1 | 10/2007 | |
| WO | 2008103163 A2 | 8/2008 | |
| WO | 2008109214 A2 | 9/2008 | |
| WO | 2009091721 A2 | 7/2009 | |
| WO | 2009091721 A3 | 7/2009 | |
| WO | 2009091724 A1 | 7/2009 | |
| WO | 2009097834 A1 | 8/2009 | |
| WO | 2010039699 A3 | 4/2010 | |
| WO | 2011123432 A1 | 10/2011 | |
| WO | 2011131757 A1 | 10/2011 | |
| WO | 2012012431 A1 | 1/2012 | |
| WO | 2012129431 A1 | 9/2012 | |
| WO | 2013163058 A1 | 10/2013 | |

OTHER PUBLICATIONS

Anderson, et al., "Ultrasonic Measurement of the Kearns Texture Factors in Zircaloy, Zirconium, and Titanium," vol. 30A, Aug. 1999, Metallurgical and Materials Transactions, 8 pp.

Directed Vapor Technologies International, Inc., "Coating Technology for the Future", downloaded on Dec. 9, 2013 at http://www.directedvapor.com/Capabilities_Brochure.pdf, 7 pp.

Lee et al., "Rare earth silicate environmental barrier coatings for Si/C/SiC composites and Si3N4 ceramics," Journal of the European Ceramic Society 25, pp. 1705-1715, Jun. 2005.

Shelby et al., "Rare earth aluminosilicate glasses," Journal of American Ceramic Society, vol. 73, No. 1, Jan. 1990, pp. 39-42.

Jordan et al., "Superior Thermal Barrier Coatings Using Solution Precursor Plasma Spray," Journal of Thermal Spray Technology, vol. 13, No. 1, Mar. 2004, pp. 57-65.

Holger Kassner, Roberto Siegert, Dag Hathiramani, Robert Vassen, and Detlev Stoever (Application of Suspension Plasma Spraying (SPS) for Manufacture of Ceramic Coatings); Journal of Thermal Spray Technology; vol. 17(1) Mar. 2008. (Year: 2008).

Prosecution History from U.S. Appl. No. 16/034,801, dated Jul. 25, 2019 through Aug. 5, 2020, 48 pp.

* cited by examiner

THERMAL BARRIER COATINGS FOR COMPONENTS IN HIGH-TEMPERATURE MECHANICAL SYSTEMS

This application is a divisional of U.S. application Ser. No. 16/034,801 filed Jul. 13, 2018, entitled "THERMAL BARRIER COATINGS FOR COMPONENTS IN HIGH-TEMPERATURE MECHANICAL SYSTEMS," which claims the benefit of U.S. Provisional Patent Application No. 62/533,422, filed Jul. 17, 2017. Each of these applications is incorporated herein by reference in its entirety.

TECHNICAL FIELD

The present disclosure relates to thermal barrier coatings.

BACKGROUND

Components of high-temperature mechanical systems, such as, for example, gas turbine engines, operate in severe environments. For example, the high-pressure turbine blades and vanes exposed to hot gases in commercial aeronautical engines typically experience exterior surface temperatures of about 1000° C., with short-term peaks as high as 1100° C. Example components of high-temperature mechanical systems may include a Ni-based or Co-based super alloy substrate or a ceramic or ceramic matrix composite substrate.

Economic and environmental concerns such as the desire for improved efficiency and reduced emissions, continue to drive the development of advanced gas turbine engines with higher inlet temperatures. Substrates of high-temperature mechanical systems may be coated with a thermal barrier coating (TBC) to reduce the substrate temperatures in order to meet the operational limits of the component.

SUMMARY

In some examples, the disclosure describes an article that includes a substrate; a first layer including a first base oxide including zirconia or hafnia and a first rare earth oxide including yttria, where the first layer has a columnar microstructure, where the first layer includes predominately the first base oxide; a second layer on the first layer, the second layer including a second base oxide including zirconia or hafnia, a second rare earth oxide including ytterbia, a third rare earth oxide including samaria, and a fourth rare earth oxide including at least one of lutetia, scandia, ceria, neodymia, europia, and gadolinia, where the second layer includes predominately the second base oxide, and where the second layer has a columnar microstructure; and a third layer on the second layer, the third layer including a third base oxide including zirconia or hafnia, the second rare earth oxide, the third rare earth oxide, and a fifth rare earth oxide including at least one of lutetia, scandia, ceria, neodymia, europia, and gadolinia, where the third layer has a dense microstructure and has a lower porosity than the second layer.

In some examples, the disclosure describes a method including depositing a first plurality of particles on a substrate to form a first layer, where the first plurality of particles includes a first base oxide including zirconia or hafnia and a first rare earth oxide including yttria, and where the first layer includes a columnar microstructure; depositing a second plurality of particles on the first layer using a suspension plasma spray technique to form a second layer, where the second plurality of particles includes a second base oxide including zirconia or hafnia, a second rare earth oxide including ytterbia, a third rare earth oxide including samaria, and a fourth rare earth oxide including at least one of lutetia, scandia, ceria, neodymia, europia, and gadolinia, where the second layer includes a columnar microstructure; and depositing a third plurality of particles using a suspension plasma spray technique to form a third layer on the second layer, where the third plurality of particles includes a third base oxide including zirconia or hafnia, the second rare earth oxide, the third rare earth oxide, and a fifth rare earth oxide including at least one of lutetia, scandia, ceria, neodymia, europia, and gadolinia, where the third layer has a dense microstructure and has a lower porosity than the second layer.

The details of one or more examples are set forth in the accompanying drawings and the description below. Other features, objects, and advantages will be apparent from the description and drawings, and from the claims.

DETAILED DESCRIPTION

Figure 1A:
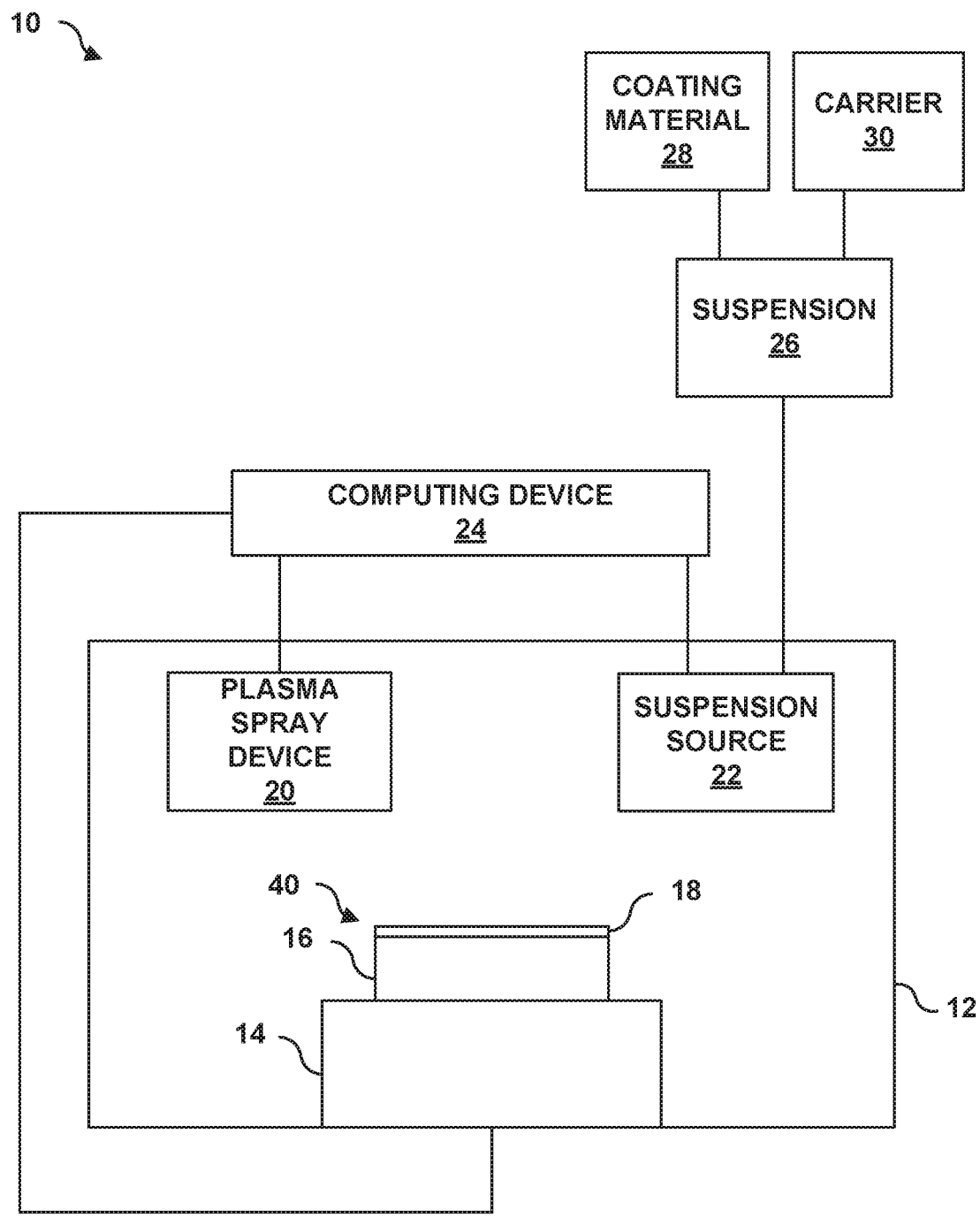
FIG. 1A is a schematic diagram illustrating an example system for forming an article that includes a multi-layer TBC on a substrate using a suspension plasma spray technique.

The disclosure describes articles including a multi-layer thermal barrier coating (TBC) formed using suspension plasma spray techniques and techniques of forming the same. In some examples, TBCs may have a low thermal conductivity to reduce the transfer of thermal energy from the high-temperature gases to the substrate. However, erosion and contamination can reduce the life of TBCs, which may make the TBC less effective at protecting the underlying substrate. Erosion and/or contamination may occur when deleterious environmental species, such as, for example, calcium magnesium aluminum silicate (CMAS), penetrate the TBC. The presence of a deleterious environmental species in the TBC may weaken or degrade the TBC layers, causing damage to an underlying substrate due to stresses imposed on the TBC during thermal cycling within the high-temperature operational environments. For example, CMAS may migrate into the layers of the TBC, reducing the insulative properties of the layer and/or physically stressing the TBC layer leading to spallation. Additionally, or alternatively, the CMAS may migrate through the TBC into underlying layers or to the underlying substrate, leading to unwanted side reactions.

A TBC with a dense microstructure may help prevent some of the deleterious environmental species from migrating into the TBC and causing degradation of the TBC, or may help prevent deleterious environmental species from migrating to other layers or the substrate and causing additional degradation of the article. However, a TBC with only a dense microstructure may be subject to increased in-plane strain during thermal cycling, such as, for example, in a high-temperature gas turbine engine. A TBC with only a dense microstructure also may exhibit increased thermal conductivity making the TBC less effective.

In some examples, improved thermal cycling performance of the TBC may be obtained with a TBC having a predominately columnar microstructure. A columnar microstructure may include columns of the coating material extending from the surface of a substrate with elongated intercolumnar voids that have a crystallographic texture. A columnar microstructure may allow for the TBC to have improved in-plane strain tolerance and a decreased thermal conductivity. However, a columnar microstructure may be less durable due to the increased porosity. Traditional deposition techniques, such as, for example, electron beam-physical vapor deposition (EB-PVD), may be capable of producing such columnar microstructures. However, EB-PVD may be complex, expensive, limited by the number of manufacturing sites with EB-PVD technology, and may have poor process efficiency, such as, for example, less than 10% efficiency in deposition of raw materials. Further, EB-PVD processes may not allow for deposition of multi-layer coatings including more than one microstructure or phase constituents.

As described herein, one or more layers of the multi-layer TBC may be deposited on a substrate using a suspension plasma spray technique. The suspension plasma spray technique may be used to form a multi-layer TBC having at least two different microstructures, such as, for example, at least one layer with a dense microstructure and at least one layer with a columnar microstructure to provide synergistic properties to the resultant TBC. For example, the multi-layer structure of the TBC may help prevent deleterious environmental species from migrating into the TBC or to the substrate, as well as provide improved thermal cycling performance of the TBC.

In some examples, the suspension plasma spray techniques described herein may be used to deposit a relatively small particle coating material (e.g., average particle size less than about 1 μm to about 25 μm, or less than about 1 μm to about 10 μm) in order to obtain a selected coating microstructure (e.g., dense or columnar). As used herein, "average particle diameter," "average diameter," or "particle size" may be an equivalent mean diameter (e.g., if the particles are not spherical) of a given particle size distribution.

Such particle sizes may be insufficient for deposition by traditional thermal spray techniques, such as plasma spray techniques, which typically utilize a minimal particle size of about 30-60 μm to avoid agglomeration or fouling of the thermal spray device. Additionally, the suspension plasma spray techniques may provide a more efficient and cost-effective way of producing the multi-layer TBC compared to vapor deposition techniques (e.g., EB-PVD).

FIG. 1A is a schematic diagram illustrating an example system 10 for forming an article 40 that includes a multi-layer TBC 18 on a substrate 16 using a suspension plasma spray technique. System 10 includes a chamber 12 that encloses a stage 14 configured to receive substrate 16, a suspension source 22, a plasma spray device 20 that receives a suspension 26 (e.g., coating material 28 suspended in carrier 30) from suspension source 22, and a computing device 24 configured to control the feed of suspension 26 from suspension source 22 to thermal spray device 20 and the subsequent deposition of coating material 28 to form multi-layer TBC 18 on substrate 16.

Figure 1B:
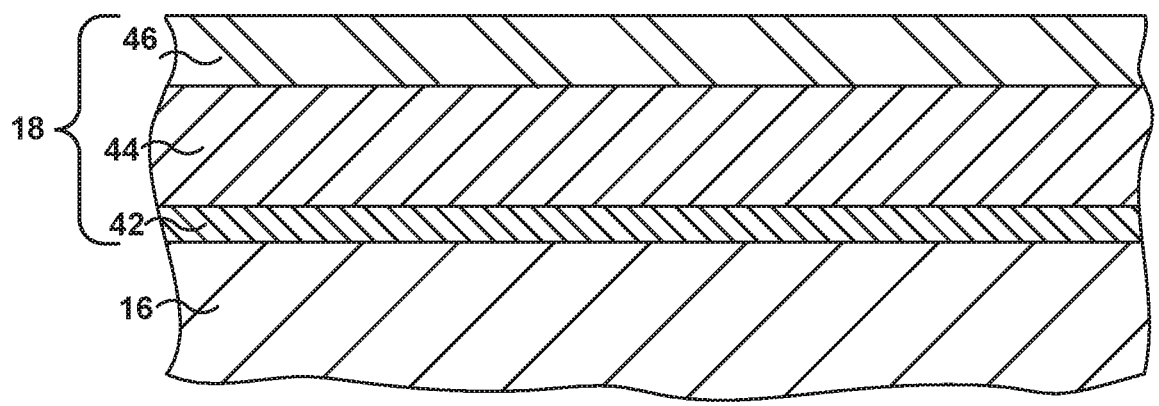
FIG. 1B is an enlarged cross-sectional view of the example article from FIG. 1A that includes a multi-layer TBC formed on substrate.

In some examples, article 40 may include a component of a gas turbine engine. For example, article 40 may include a part that forms a portion of a flow path structure, a seal segment, a blade track, an airfoil, a blade, a vane, a combustion chamber liner, or another portion of the gas turbine engine. FIG. 1B is an enlarged cross-sectional view of the example article 40 from FIG. 1A that includes multi-layer TBC 18 on substrate 16 using system 10. As used herein, "formed on" and "on" means a layer or coating that is formed on top of another layer or coating and encompasses both a first layer or coating formed immediately adjacent a second layer or coating and a first layer or coating formed on top of a second layer or coating with one or more intermediate layers or coatings present between the first and second layers or coatings. In contrast, "formed directly on" and "directly on" denote a layer or coating that is formed immediately adjacent to another layer or coating, i.e., there are no intermediate layers or coatings. In some examples, as shown in FIG. 1B, multi-layer TBC 18 may be directly on substrate 16.

Substrate 16 may include a material suitable for use in a high-temperature environment. In some examples, substrate 16 includes a super alloy including, for example, an alloy based on Ni, Co, Ni/Fe, or the like. In examples where substrate 16 includes a super alloy material, substrate 16 may also include one or more additives such as titanium (Ti), cobalt (Co), or aluminum (Al), which beneficially affect the mechanical properties of substrate 16 including, for example, toughness, hardness, temperature stability, corrosion resistance, oxidation resistance, or the like.

In some examples, substrate 16 may include a ceramic or a ceramic matrix composite (CMC). Suitable ceramic materials, may include, for example, a silicon-containing ceramic, such as silica ($SiO_2$), silicon carbide (SiC); silicon nitride ($Si_3N_4$); alumina ($Al_2O_3$); an aluminosilicate; a transition metal carbide (e.g., WC, $Mo_2C$, TiC); a silicide (e.g., $MoSi_2$, $NbSi_2$, $TiSi_2$); combinations thereof; or the like. In some examples in which substrate 16 includes a ceramic, the ceramic may be substantially homogeneous.

In examples in which substrate 16 includes a CMC, substrate 16 may include a matrix material and a reinforcement material. The matrix material may include, for example, silicon metal or a ceramic material, such as silicon carbide (SiC), silicon nitride ($Si_3N_4$), an aluminosilicate, silica ($SiO_2$), a transition metal carbide or silicide (e.g., WC, $Mo_2C$, TiC, $MoSi_2$, $NbSi_2$, $TiSi_2$), or other ceramics described herein. The CMC may further include a continuous or discontinuous reinforcement material. For example, the reinforcement material may include discontinuous whiskers, platelets, fibers, or particulates. Additionally, or alternatively, the reinforcement material may include a continuous monofilament or multifilament two-dimensional or three-dimensional weave. In some examples, the reinforcement material may include carbon (C), silicon carbide (SiC), silicon nitride ($Si_3N_4$), an aluminosilicate, silica ($SiO_2$), a transition metal carbide or silicide (e.g. WC, $Mo_2C$, TiC, $MoSi_2$, $NbSi_2$, $TiSi_2$), another ceramic material described herein, or the like.

In some examples, the composition of the reinforcement material is the same as the composition of the matrix material. For example, a matrix material including silicon carbide may surround a reinforcement material including silicon carbide whiskers or fibers. In other examples, the reinforcement material includes a different composition than the composition of the matrix material, such as aluminosilicate fibers in an alumina matrix, or the like. In some examples, substrate 16 that includes a CMC comprising a reinforcement material of silicon carbide fibers embedded in a matrix material of silicon carbide. In some examples, substrate 16 includes a SiC—SiC CMC.

Multi-layer TBC 18 may be deposited on substrate 16 using the suspension plasma spray techniques of the present disclosure. Multi-layer TBC 18 may reduce the transfer of thermal energy from high-temperature gases to substrate 16; help prevent deleterious environmental species (e.g., CMAS) from migrating into the layers of TBC 18, any optional underlying layers, or substrate 16; provide erosion resistance; improve thermal cycling performance of article 40; or combinations thereof.

Multi-layer TBC 18 includes a first layer 42, a second layer 44, and a third layer 46. Each layer of multi-layer TBC 18 may contribute to properties of multi-layer TBC 18, and each layer may be selected independently to provide similar or different properties to multi-layer TBC 18. For example, first layer 42 may provide improved thermal cycling performance, second layer 44 may provide a low thermal conductivity, and third layer 46 may improve erosion resistance and/or CMAS resistance.

First layer 42 includes a first base oxide of either zirconia or hafnia and a first rare earth oxide of yttria deposited in a columnar microstructure on substrate 16. For example, first layer 42 may include yttria-stabilized zirconia or hafnia, that includes predominately (e.g., the main component or a majority) of the first base oxide zirconia ($ZrO_2$) or hafnia ($HfO_2$) mixed with a minority amount of yttria ($Y_2O_3$). In some examples, the first base oxide may consist of zirconia. The use of the terms "first," "second," "third," etc. oxide is used in an ordinal sense to identify and distinguish among the different oxide components of the various layers rather than in the cardinal sense to limit or imply the total number of oxides that may be present within a respective layer.

In some examples, first layer 42 may consist essentially of zirconia and yttria. As used herein, to "consist essentially of" means to consist of the listed element(s) or compound(s), while allowing the inclusion of impurities present in small amounts such that the impurities do no substantially affect the properties of the listed element or compound. For example, the purification of many rare earth elements may be difficult, and thus the nominal rare earth element may include small amounts of other rare earth elements. This mixture is intended to be covered by the language "consists essentially of." In some examples, first layer 42 may consist essentially of yttria-stabilized-zirconia, which includes about 92 weight percent (wt. %) to about 94 wt. % of the base oxide zirconia stabilized by about 6 wt. % to about 8 wt. % of the rare earth oxide yttria.

In some examples, having first layer 42 consist essentially of zirconia and yttria may improve the layer's thermal cycling resistance (e.g., a long thermal cycling life), and/or adhesion to underlying substrate 16 or an optional bond coat. For example, first layer 42 consisting essentially of zirconia and yttria may reduce the coefficient of thermal expansion of the layer such that it is more comparable to that of substrate 16. Additionally, or alternatively, the overall high purity of first layer 42 (e.g., compared to the purity of second layer 44 which may include additional oxides) may reduce the chance of side reactions or coefficient of thermal expansion mismatches within the layer to provide better long-term adhesion between first layer 42 and substrate 16.

First layer 42 may have a coefficient of thermal expansion that lies between that of substrate 16 and second layer 44. In this way, the coefficient of thermal expansion mismatch may be reduced due to first layer 42 acting as an intermediate or gradient layer between substrate 16 and second layer 44. In turn, first layer 42 may reduce stress due to thermal expansion between substrate 16 and second layer 44 to improve the working life of article 40.

In some examples, first layer 42 may be deposited on substrate 16 using the suspension plasma spray techniques of the present disclosure. The suspension plasma spray techniques may allow the resultant first layer 42 to have a substantially columnar microstructure that provides improved thermal cycling performance by reducing the in-plane strain exerted between substrate 16 and first layer 42 during thermal cycling in comparison to a comparable layer that does not possess a columnar microstructure.

As described further below, the columnar microstructure of first layer 42 may be obtained using system 10 to spray deposit a coating material 28 that includes very fine particles (e.g., average particle size less than about 1 μm) of the base oxide (e.g., zirconia) and rare earth oxide yttria. As used herein, "very fine particles" is intended to describe particles with an average particle diameter of less than about 1 μm. During the suspension plasma spray process, the very fine particles of coating material 28 may be carried by the plasma stream of plasma spray device 20 to be deposited on substrate 16. Due to the small particle size, coating material 28 is more likely to be deflected within the plasma stream as the stream contacts the surface of substrate 16. The deflection causes the very fine particles of coating material 28 to deposit on substrate 16 at angles other than normal to the surface of substrate 16. This process allows coating material 28 to be deposited with the formation of columns within the microstructure, which may otherwise not be possible with larger particle sizes (e.g., greater than 1 μm). For example, coating material 28 may follow trajectories of the plasma stream as the stream contacts the surface of substrate 16 and deflects horizontally along the surface of substrate 16. In turn, as coating material 28 is deposited, the deposits form asperities creating shadows downstream of the trajectory of coating material 28 in the plasma stream. In some such examples, coating material 28 may not deposit in at least some of the shadows, resulting in the formation the inter-columnar voids of the columnar microstructure. The columnar microstructure of first layer 42 may provide increased in-plane strain tolerance and improved thermal cycling resistance, resulting in better adhesion properties and a more robust article 40.

In other examples, first layer 42 may be deposited using techniques other than the suspension plasma spray techniques described herein including, for example, traditional thermal spraying, including, air plasma spraying, high velocity oxy-fuel (HVOF) spraying, low vapor plasma spraying; physical vapor deposition (PVD), including EB-PVD, directed vapor deposition (DVD), and cathodic arc deposition; chemical vapor deposition (CVD); slurry process deposition; sol-gel process deposition; electrophoretic deposition; or the like. In the case in which first layer 42 is deposited using an alternative deposition technique, first layer 42 may still include a substantially columnar microstructure. However, compared to some alternative techniques (e.g., EB-PVD) the suspension plasma spray techniques described herein may demonstrate a higher conversion yield of the raw materials into the coating layer (e.g., an efficiency of more than about 50% as compared to an efficiency of about 10% associated with EB-PVD).

In some examples, first layer 42 may be a relatively thin layer. For example, first layer 42 may be between about 0.0005 inches and about 0.003 inches (e.g., between about 10 µm and about 80 µm). Even at these relatively small thicknesses, first layer 42 may contribute to thermal cycling performance of multi-layer TBC 18.

Second layer 44 may include a second base oxide of zirconia or hafnia and at least one rare earth oxide, such as, for example, oxides of Lu, Yb, Tm, Er, Ho, Dy, Gd, Tb, Eu, Sm, Pm, Nd, Pr, Ce, La, Y, Sc, and combinations thereof, on first layer 42 with a columnar microstructure. Second layer 44 may include predominately (e.g., the main component or a majority) the base oxide zirconia or hafnia mixed with a minority amounts of the at least one rare earth oxide.

In some examples, second layer 44 may include the second base oxide and a second rare earth oxide including ytterbia, a third rare earth oxide including samaria, and a fourth rare earth oxide including at least one of lutetia, scandia, ceria, neodymia, europia, and gadolinia. In some examples, the fourth rare earth oxide may include gadolinia such that the second layer 44 may include the second base oxide (e.g., zirconia), ytterbia, samaria, and gadolinia deposited on first layer 42 with a columnar microstructure. Second layer 44 may include predominately (e.g., the main component or a majority) the second base oxide (e.g., zirconia) mixed with a minority amounts of ytterbia, gadolinia, and samaria. The below description of second layer 44 is primarily described with respect to the second base oxide including zirconia and the second, third, and fourth rare earth oxides including ytterbia, gadolinia, and samaria, however in other examples, other rare earth oxides may be used and/or hafnia may be used as the second base oxide.

In some examples, the composition (e.g., zirconia, ytterbia, gadolinia, and samaria) and the columnar microstructure of second layer 44 may provide improved thermal insulation and protection to substrate 16 from high temperatures, e.g., high-temperature of the turbine gas compared to other coating compositions or microstructures. For example, during operation of article 40 in a high temperature environment, heat is transferred through multi-layer TBC 18 through conduction and radiation. The inclusion of one or more rare earth oxides, such as ytterbia, gadolinia, and samaria within a layer of predominately zirconia may help decrease the thermal conductivity of second layer 44. While not wishing to be bound by any specific theory, the inclusion of ytterbia, gadolinia, and samaria in second layer 44 may reduce thermal conductivity through one or more mechanisms, including phonon scattering due to point defects and grain boundaries in the zirconia crystal lattice due to the rare earth oxides, reduction of sintering, and porosity.

The composition of second layer 44 may be selected to provide a desired phase constitution. Accessible phase constitutions include tetragonal prime (t'), cubic, and compound $RE_2O_3$—$ZrO_2$ or $RE_2O_3$—$HfO_2$ (where RE is a rare earth element) phase constitutions measured using x-ray diffraction. Second layer 44 may include tetragonal prime (t'), cubic, or compound phase constitutions or combinations thereof.

For example, to achieve a compound phase constitution, a layer may include about 20 mol. % to about 40 mol. % ytterbia, about 10 mol. % to about 20 mol. % gadolinia, about 10 mol. % to about 20 mol. % samaria, and the balance the respective base oxide (e.g., zirconia or hafnia) and any impurities present.

To achieve a cubic phase constitution, a layer may include about 3 mol. % to about 10 mol. % ytterbia, about 1 mol. % to about 5 mol. % gadolinia, about 1 mol. % to about 5 mol. % samaria, and the balance the respective base oxide (e.g., about 80 mol. % to about 95 mol. % zirconia or hafnia) and any impurities present.

To achieve a tetragonal prime phase constitution, a layer may include about 1 mol. % to about 5 mol. % ytterbia, about 0.1 mol. % to about 3 mol. % gadolinia, and about 0.1 mol. % to about 3 mol. % samaria, and the respective base oxide (about 89 mol. % to about 98.8 mol. % zirconia or hafnia) and any impurities present.

In some examples, second layer 44 may include or include a majority of a cubic phase constitution (e.g., the majority of second layer 44 consists of a cubic phase constitution). In some examples, second layer 44 may consist essentially of a cubic phase constitution. The cubic phase constitution may provide second layer 44 with a lower thermal conductivity than a layer having a similar composition, but with a tetragonal prime or a compound phase constitution.

In some examples, second layer 44 may include ytterbia in a concentration of between about 3 mol. % and about 10 mol. %, gadolinia in a concentration between about 1 mol. % and about 5 mol. %, samaria in a concentration between about 1 mol. % and about 5 mol. %, and the balance zirconia and any impurities present in a cubic phase constitution. In some examples, second layer 44 may include ytterbia in a concentration of between about 3.5 mol. % and about 4.5 mol. % (e.g., about 4 mol. %), gadolinia in a concentration between about 2.5 mol. % and about 3.5 mol. % (e.g., about 3 mol. %), samaria in a concentration between about 2.5 mol. % and about 3.5 mol. % (e.g., about 4 mol. %), and the balance zirconia (e.g., about 88.5 mol. % to about 91.5 mol. %) and any impurities present in a cubic phase constitution.

In some examples, the inclusion of ytterbia, gadolinia, and samaria in second layer 44 may also provide second layer 44 with increased resistance to CMAS degradation compared by yttria-stabilized zirconia, reduce the thermal conductivity of second layer 44, or both. Although the composition of second layer 44 is described with respect to zirconia, ytterbia, gadolinia, and samaria, one or more of the zirconia, ytterbia, gadolinia, and samaria may be replaced by one or more of hafnia or a rare earth oxide, such as, for example, oxides of Lu, Yb, Tm, Er, Ho, Dy, Gd, Tb, Eu, Sm, Pm, Nd, Pr, Ce, La, Y, or Sc.

As with first layer 42, the suspension plasma spray techniques described herein may be used to deposit second layer 44 on first layer 42. For example, system 10 may be used to deposit a very fine particle coating material 28 (e.g., average particle size less than about 1 µm) having the compositional makeup of second layer 44 to form second layer 44 with a columnar microstructure. As described above, coating material 28 with very fine particle sizes may be used to generate the columnar microstructure which may otherwise not be obtained using traditional thermal spray techniques. The use of very fine particles with the suspension plasma spray techniques as described herein may result in second layer 44 including a substantially columnar microstructure that provides improved thermal cycling performance and thermal insulative properties in comparison to other layers that do not possess a columnar microstructure.

In some examples, second layer 44 may have a thickness of between about 0.001 inches and about 0.03 inches (e.g., between about 25 µm and about 7650 µm). For example, second layer 44 may be between about 0.004 inches and about 0.015 inches (e.g., between about 100 µm and about 380 µm).

Multi-layer TBC 18 also includes third layer 46, which may exhibit a relatively dense microstructure. The relatively dense microstructure may reduce or substantially prevent exposure of substrate 16 to deleterious environmental species (e.g., CMAS), prevent deterioration and erosion of multi-layer TBC 18, and increase the service life of substrate 16.

Third layer 46 may include a third base oxide of zirconia or hafnia and at least one rare earth oxide, such as, for example, oxides of Lu, Yb, Tm, Er, Ho, Dy, Gd, Tb, Eu, Sm, Pm, Nd, Pr, Ce, La, Y, Sc, and combinations thereof, on second layer 44 with a dense microstructure. Third layer 46 may include predominately (e.g., the main component or a majority) the third base oxide of zirconia or hafnia mixed with a minority amounts of the at least one rare earth oxide.

In some examples, third layer 46 may include the third base oxide and the second rare earth oxide including ytterbia, the third rare earth oxide including samaria, and a fifth rare earth oxide including at least one of lutetia, scandia, ceria, neodymia, europia, and gadolinia. In some examples, the fifth rare earth oxide may include gadolinia such that third layer 46 may include predominately (e.g., the main component or a majority) the third base oxide (e.g., zirconia) mixed with a minority amounts of ytterbia, gadolinia, and samaria on second layer 44 in a dense microstructure. The below description of third layer 44 is primarily described with respect to the layer including zirconia and the rare earth oxides ytterbia, gadolinia, and samaria, however in other examples, other rare earth oxides may be used and/or hafnia may be used as the third base oxide.

As used herein, a "dense microstructure" may be characterized by a layer with a relatively low resultant volume porosity (e.g., a porosity of less than about 5 percent by volume (vol. %)). In other examples, third layer 46 may have a porosity greater than about 5 vol. %, such as for example a porosity of less than about 20 vol. %, such as less than about 15 vol. %, or less than about 10 vol. %. In some examples, second layer 44 may have first porosity, and third layer 46 may have a second porosity, and the second porosity of third layer 46 may be less than the first porosity of second layer 44. The porosity of deposited third layer 46 may be measured as a percentage of pore volume divided by total volume of the layer, and may be measured using optical microscopy or mercury porosimetry. In some examples, the porosity of third layer 46 may be measured using ASTM B328-94. The relatively low level of porosity may reduce the migration of deleterious elements (e.g., CMAS) through third layer 46 that may otherwise damage or degrade substrate 16, other layers included in multi-layer TBC 18, or other layers within article 40. Additionally, or alternatively, the composition of third layer 46 and the relatively low porosity may improve the durability of the layer and article 40. The relatively low porosity of third layer 46 may also improve the erosion resistance of third layer 46.

The composition of third layer 46 may be selected to provide one or more desired phase constitutions, as described above with respect to second layer 44. In some examples, third layer 46 may include or include a majority of a tetragonal prime phase constitution. In some examples, third layer 46 may include ytterbia in a concentration of between about 1 mol. % and about 5 mol. %, gadolinia in a concentration between about 0.1 mol. % and about 3 mol. %, samaria in a concentration between about 0.1 mol. % and about 3 mol. %, and the balance zirconia (e.g., about 89 mol. % to about 98.8 mol. %) and any impurities present in the phase constitution. In some examples, third layer 46 may include ytterbia in a concentration of between about 2 mol. % and about 4 mol. % (e.g., about 2.5 mol. %), gadolinia in a concentration between about 0.1 mol. % and about 2 mol. % (e.g., about 1 mol. %), samaria in a concentration between about 0.1 mol. % and about 1 mol. % (e.g., about 0.5 mol. %), and the balance zirconia and any impurities present in a tetragonal prime phase constitution.

In some examples, the zirconia, ytterbia, gadolinia, and samaria present in the third layer 46 may consist essentially of a tetragonal prime phase constitution. Although the composition of third layer 46 is described with respect to zirconia, ytterbia, gadolinia, and samaria, one or more of the zirconia, ytterbia, gadolinia, and samaria may be replaced by one or more of hafnia or a rare earth oxide, such as, for example, oxides of Lu, Yb, Tm, Er, Ho, Dy, Gd, Tb, Eu, Sm, Pm, Nd, Pr, Ce, La, Y, or Sc.

In some examples, a layer including a tetragonal prime phase constitution may have improved thermal cycling resistance and/or durability in comparison to a layer including a cubic phase constitution, but generally exhibits a higher thermal conductivity than a comparable layer including a cubic phase constitution. Thus, by forming TBC 18 with second layer 44 having a columnar microstructure and substantially cubic phase constitution of zirconia, ytterbia, gadolinia, and samaria and third layer 46 with a dense microstructure and substantially tetragonal prime phase constitution of zirconia, ytterbia, gadolinia, and samaria, the two layers may provide multi-layer TBC 18 with low thermal conductivity, improved thermal cycling resistance, and improved overall durability.

In some examples, third layer 46 may be deposited with a dense microstructure using the suspension plasma spray techniques described herein. For example, by controlling one or more of the deposition parameters of the suspension plasma spray techniques, coating material 28 may be deposited as relatively dense microstructure with low porosity. One parameter that may affect the resultant microstructure of the deposited layer is the particle size of coating material 28. For example, coating material 28 including a fine particle (e.g., between about 1 μm and about 25 μm) may result in third layer 46 with a dense microstructure. As used herein, "fine particle" is intended to describe particles with an average particle diameter between about 1 μm and about 25 μm. The fine particles of coating material 28 (e.g., in comparison to other deposition techniques) may permit a more compressed arrangement of the deposited particles resulting in third layer 46 with a reduced porosity, reduced pore size, higher density, or combinations thereof. The increased density of third layer 46 may help prevent exposure of the surface of a substrate to deleterious environmental species, prevent deterioration and erosion of multi-layer TBC 18, and increase the service life of substrate 16.

In some examples, the size of the pores that are present in third layer 46 may be smaller than pores generated using other thermal spray techniques. For example, due to the particle size associated with traditional plasma spray techniques (e.g., particle diameters on the order of about 30-60 μm), the resultant pores produced between the deposited particles will remain relatively large due to the geometric size and shape of the deposited particles. Because the suspension plasma spray techniques described herein can be used to deposit relatively small size particles (e.g., particle diameters less than about 25 μm), the pores between the deposited particles may likewise be reduced in size. The reduced pore size may result in the pores between deposited particles to be less likely to be interconnected within the thickness of third layer 46. In some examples, pores of third layer 46 may be on the order of about 1 μm to about 10 μm. The smaller pore size of third layer 46 may reduce migration of deleterious compounds, e.g., CMAS, through third layer 46. Additionally, or alternatively, the smaller pore size may provide phonon scattering, increased difficulty of heat transfer though third layer 46, and/or a decreased thermal conductivity of third layer 46.

Additionally, or alternatively, the suspension plasma spray techniques described herein may help reduce the overall production cost and time for forming multi-layer TBC 18. For example, using traditional techniques, multi-layer TBC 18 may have to be deposited using multiple techniques, such as, for example, conventional plasma spraying and EB-PVD, in order to obtain multi-layer TBC 18 with more than one microstructure, e.g., second layer 44 with a columnar microstructure and third layer 46 with a dense microstructure. Using the suspension plasma spray techniques of the present disclosure, process parameters may be adjusted to influence the microstructure of the resultant layer of multi-layer TBC 18.

In some examples, third layer 46 may have a thickness of between about 0.001 inches and about 0.005 inches (e.g., between about 25 µm and about 130 µm).

In some examples, third layer 46 may further include alumina ($Al_2O_3$). The presence of alumina in third layer 46 may improve the durability and toughness of third layer 46. Additionally, or alternatively, the presence of alumina in third layer 46 may provide enhanced erosion and contamination resistance of multi-layer TBC 18 compared to some TBCs that do not include a layer including alumina. For example, including of alumina may reduce a reaction rate with alumina components in CMAS.

In examples in which third layer 46 includes alumina, the layer may include at least two distinct phase constitutions including a first phase including the third base oxide (e.g., zirconia), the second rare earth oxide (e.g., ytterbia), the third rare earth oxide (e.g., samaria), and the fifth rare earth oxide (e.g., gadolinia) (e.g., a tetragonal prime phase constitution) and a second phase including alumina. The presence of more than one phase may help enhance the creep strength of third layer 46 compared to a single-phase layer, which in turn, may increase the durability and useful life of third layer 46 and multi-layer TBC 18.

In some examples, the predominate phase (e.g., present at more than 50 vol. %) of the third layer 46 may include the third base oxide (e.g., zirconia), the second rare earth oxide (e.g., ytterbia), the third rare earth oxide (e.g., samaria), and the fifth rare earth oxide (e.g., gadolinia). Depending on the composition of third layer 46, the alumina may be present as a second phase dispersed within the first phase. For example, the first phase may be a substantially continuous throughout third layer 46 (e.g., the first phase material remains connected throughout third layer 46) with discrete second phase regions of alumina included within the substantially continuous first phase.

In some examples, third layer 46 including alumina may include a boundary region between the first phase including the third base oxide (e.g., zirconia), the second rare earth oxide (e.g., ytterbia), the third rare earth oxide (e.g., samaria), and the fifth rare earth oxide (e.g., gadolinia) and the second phase including the alumina. The boundary region between the first and second phases may include a reaction product from a reaction between the oxides of the first phase and the alumina of the second phase or may include a different crystal structure where the alumina alloys with, e.g., the zirconia, ytterbia, gadolinia, and samaria. Alternatively, or in addition, the optional alumina of third layer 46 may be alloyed throughout the phase including the third base oxide (e.g., zirconia), the second rare earth oxide (e.g., ytterbia), the third rare earth oxide (e.g., samaria), and the fifth rare earth oxide (e.g., gadolinia).

In some examples, the first phase may include a tetragonal prime phase constitution with ytterbia in a concentration between about 2 mol. % and about 4 mol. % (e.g., about 2.5 mol. %), gadolinia in a concentration between about 0.1 mol. % and about 2 mol. % (e.g., about 1 mol. %), samaria in a concentration between about 0.1 mol. % and about 1 mol. % (e.g., about 0.5 mol. %), and the and the balance the third base oxide (e.g., zirconia) and any impurities present. The second phase of third layer 46 may include or consist essentially of alumina. Third layer 46 may include between about 10 mol. % and about 50 mol. % alumina. For example, third layer 46 may include between about 10 mol. % and about 50 mol. % alumina, between about 10 mol. % and about 30 mol. % alumina, or between about 10 mol. % and about 20 mol. % alumina. The two phases may be deposited as third layer 46 using the suspension plasma spray deposition techniques described herein by, for example, pre-mixing particles of the alumina phase and pre-alloyed tetragonal prime phase constitutions together in suspension 26.

Returning to FIG. 1A, system 10 may be used to apply one or more layers of multi-layer TBC 18 to substrate 16 using a suspension plasma spray technique. Chamber 12 may substantially enclose (e.g., enclose or nearly enclose) stage 14 that receives substrate 16, and plasma spray device 20. In some examples, stage 14 may be configured to selectively position and restrain substrate 16 in place relative to plasma spray device 20 during formation of multi-layer TBC 18. For example, stage 14 may be translatable and/or rotatable along at least one axis to position substrate 16 relative to plasma spray device 20 to facilitate the application of multi-layer TBC 18 on substrate 16 via plasma spray device 20.

System 10 also includes suspension source 22 configured to deliver a suspension 26 including a coating material 28 (e.g., the solid materials that form one of the layers of multi-layer TBC 18) and a carrier 30 to plasma spray device 20 or a plume generated by plasma spray device 20. In some examples, suspension source 22 may include a nozzle or other apparatus within chamber 12 for introducing suspension 26 to plasma spray device 20 or a plume generated by plasma spray device 20. Suspension source 22 may be communicatively coupled to computing device 24, such that computing device 24 may control suspension source 22 (e.g., opening or closing a valve, positioning suspension source 22, controlling a flow rate of suspension 26 from suspension source 22 to plasma spray device 20, or the like).

Coating material 28 may include a particle form of the respective materials used to form first layer 42, second layer 44, and third layer 46 of multi-layer TBC 18. For example, coating material 28 may include zirconia and yttria to deposit first layer 42; zirconia, ytterbia, gadolinia, and samaria to deposit second layer 44; or zirconia, ytterbia, gadolinia, samaria, and optionally alumina, to deposit third layer 46, as described above. Coating material 28 may be in the form of particles to facilitate softening or vaporization of coating material 28 by a heated plume created by plasma spray device 20. In some examples, coating material 28 may include separate coating materials for each respective layer of first layer 42, second layer 44, and third layer 46.

In some examples, coating material 28 may include a single particle type, e.g., a pre-alloyed particle with the desired composition and/or phase constitution. The single particle type may allow for a uniform disbursement and control the composition and/or phase constitution of the resultant layer of multi-layer TBC 18. The pre-alloyed particles may include a desired phase constitution for the layer to be deposited, e.g., cubic or tetragonal prime phase constitutions. In other examples, coating material 28 may include discrete particles, e.g., distinct particles of each of the base oxide, rare earth oxides, and alumina (where used) combined to make up the composition of the respective layer of multi-layer TBC 18. The particle materials may be mechanically premixed within suspension 26 prior to deposition. Due to the relatively small particle size used in the suspension plasma spray techniques, the discrete particles may intimately mix during the deposition process to form the desired phase constitution.

In some examples, coating material 28 may have a very fine particle size, which may result in deposition of a layer with a columnar microstructure. As described above, the very fine particle diameter sizes may allow for vaporization of at least some of the particles and may allow for coating material 28 to be deflected within the plasma stream, causing coating material 28 to deposit on substrate 16 at angles other than normal to the surface of substrate 16 and resulting in a layer with a columnar microstructure. In some examples, the particle size of coating material 28 for creating the columnar microstructure may define an average particle diameter between about 0.01 μm and about 1 μm, between about 0.01 μm and about 0.5 μm, or between about 0.01 μm and about 0.05 μm.

In other examples, coating material 28 may be deposited as a layer including a dense microstructure (e.g., third layer 46). In some examples, the average particle diameter for producing a layer with a dense microstructure may still remain relatively small (e.g., an average particle diameter less than about 25 μm, less than about 10 μm, or less than about 1 μm) compared to particle sizes used with traditional plasma spray techniques. In some examples, the particles sizes may be similar to the particles sizes used to form a columnar microstructure but may result in a dense microstructure by modifying the deposition parameters, such as, for example, the spraying distance and/or power, of system 10. For example, decreasing the spraying distance, decreasing the suspension feed rate, and/or increasing the power may result in a dense microstructure even when relatively small particles are used. In some examples, the dense microstructure obtained by the suspension plasma spray techniques described herein may allow for a layer of multi-layer TBC 18 to exhibit a decreased overall porosity and resultant higher density compared to a comparable layer deposited using traditional thermal spray techniques.

Suspension 26 also includes carrier 30 that acts as a carrier fluid and allows small particles (e.g., less than about 25 μm or less than about 10 μm) of coating material 28 to be used without agglomeration of the particles prior to deposition. In some examples, carrier 30 may be a water-based or alcohol-based solvent. Examples of suitable materials for carrier 30 may include, for example, water, ethanol, methanol, isopropyl alcohol, or the like.

Coating material 28 may be added to carrier 30 to form suspension 26. In some examples, suspension 26 may include may include about 1 vol. % to about 30 vol. % solid loading of coating material 28 in carrier 30. In some examples, coating material 28 may be added to carrier 30 to form suspension 26 with a desired viscosity, stability of the colloidal suspension, e.g., flocculation, heat capacity, or any other parameter to fit the needs of system 10. In some examples, suspension 26 may include a combustible liquid that may undergo an exothermic reaction upon spraying.

In some examples, suspension 26 may further include one or more delivery aids (e.g., additives that do not form multi-layer TBC 18 but aid in the delivery or deposition of coating material 28 within carrier 30). Examples of delivery aids may include one or more dispersants or surfactants. In some examples, a surfactant may help improve the stability and dispersion of the colloidal suspension. In some examples, system 10 may further include one or more mixers in order to maintain suspension 26, e.g., maintain coating material 28 suspended in carrier 20.

Plasma spray device 20 may include a plasma spray gun including a cathode and an anode separated by a plasma gas channel. As the plasma gas flows through the plasma gas channel, a voltage may be applied between the cathode and anode to cause the plasma gas to form a plasma. In some such examples, suspension 26 may be injected inside plasma spray device 20 such that the suspension flows through part of the plasma gas channel. In other examples, suspension 26 may be introduced to a plume of the plasma external to plasma spray device 20. Upon introduction to the plasma gas, carrier 30 in suspension 26 may evaporate allowing coating material 28 to be heat softened or vaporized followed by the subsequent deposition of coating material 28 on substrate 16 in the form of a layer of multi-layer TBC 18.

System 10 also includes computing device 24. Computing device 24 may include, for example, a desktop computer, a laptop computer, a workstation, a server, a mainframe, a cloud computing system, or the like. Computing device 24 may include or may be one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some examples, the functionality of computing device 24 may be provided within dedicated hardware and/or software modules.

Computing device 24 may be configured to control operation of system 10, including, for example, stage 14, suspension source 22, and/or plasma spray device 20. For example, computing device 24 may be configured to control operation of stage 14, suspension source 22, and/or plasma spray device 20 to position substrate 16 relative to suspension source 22 and/or plasma spray device 20. In such examples, computing device 24 may control suspension source 22 and plasma spray device 20 to maneuver the position of substrate 16 relative to plasma spray device 20 to facilitate the deposition of multi-layer TBC 18.

Computing device 24 may be communicatively coupled to at least one of stage 14, suspension source 22, and plasma spray device 20 using respective communication connections. Such connections may be wireless or wired connections.

Figure 2:
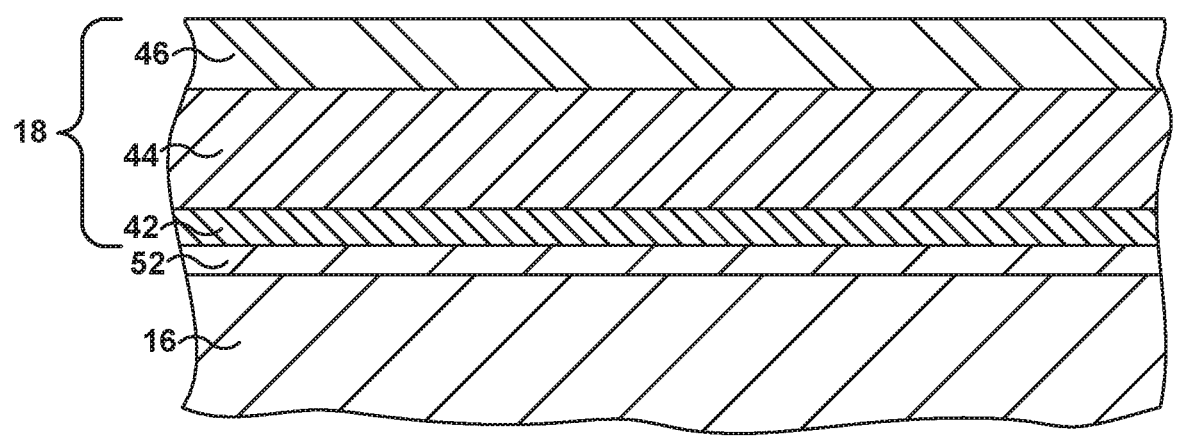
FIG. 2 is a cross-sectional diagram of an example article that includes a multi-layer TBC deposited on a bond coat and a substrate using a suspension thermal spray technique.

In some examples, article 40 may also include one or more intermediate layers (e.g., a bond coat) positioned between TBC 18 and substrate 16. For example, FIG. 2 is a cross-sectional diagram of an example article 60 that includes a multi-layer TBC 18 deposited on a bond coat 52 and a substrate 16 using the suspension plasma spray techniques described herein. Multi-layer TBC 18 may be the same or substantially the same as multi-layer TBC 18 described with respect to FIG. 1B apart from any difference noted below.

Bond coat 52 may be deposited on or deposited directly on substrate 16 to promote adhesion between substrate 16 and one or more additional layers deposited on bond coat 52, including, for example, multi-layer TBC 18 (e.g., first layer 42). In examples in which substrate 16 includes a superalloy, bond coat 52 may include an alloy, such as a MCrAlY alloy (where M is Ni, Co, or NiCo), a β-NiAl nickel aluminide alloy (either unmodified or modified by Pt, Cr, Hf, Zr, Y, Si, and combinations thereof), a γ-Ni+γ'—Ni$_3$Al nickel aluminide alloy (either unmodified or modified by Pt, Cr, Hf, Zr, Y, Si, and combinations thereof), or the like. In some examples, bond coat 52 may include Pt.

In other examples, bond coat 52 may include ceramics or other materials that are compatible with substrate 16 that includes a ceramic or a CMC. For example, bond coat 52 may include mullite (aluminum silicate, Al$_6$Si$_2$O$_{13}$), silica, silicides, silicon, or the like. Bond coat 52 may further include other ceramics, such as rare earth silicates including lutetium (Lu) silicates, ytterbium (Yb) silicates, thulium (Tm) silicates, erbium (Er) silicates, holmium (Ho) silicates, dysprosium (Dy) silicates, gadolinium (Gd) silicates, terbium (Tb) silicates, europium (Eu) silicates, samarium (Sm) silicates, promethium (Pm) silicates, neodymium (Nd) silicates, praseodymium (Pr) silicates, cerium (Ce) silicates, lanthanum (La) silicates, yttrium (Y) silicates, scandium (Sc) silicates, or the like.

Bond coat 52 may be selected based on a number of considerations, including the chemical composition and phase constitution of multi-layer TBC 18 (e.g., first layer 42) and substrate 16. For example, when substrate 16 includes a superalloy with a γ-Ni+γ'—Ni$_3$Al phase constitution, bond coat 52 may include a γ-Ni+γ'—Ni$_3$Al phase constitution to better match the coefficient of thermal expansion of substrate 16, and therefore increase the mechanical stability (adhesion) of bond coat 52 to substrate 16. Alternatively, when substrate 16 includes a CMC, bond coat 52 may include silicon and/or a ceramic, such as, for example, mullite or a rare earth silicate.

In some examples, bond coat 52 may include multiple layers. In some such examples, the different layers of bond coat 52 may perform separate functions. For example, in some examples in which substrate 16 is a CMC including silicon carbide, bond coat 52 may include a first layer of silicon deposited on substrate 16, followed by a second layer including mullite or a rare earth silicate. The silicon layer may provide better bonding to substrate 16, while the ceramic layer may prevent water vapor from reaching the silicon layer and/or provide better coefficient of thermal expansion mating with the layers of TBC 18.

In some examples, bond coat 52 may be deposited using a suspension plasma spray technique, e.g., as described herein. In other examples, bond coat 52 may be deposited using other techniques including, for example, traditional thermal spraying, including, air plasma spraying, HVOF spraying, low vapor plasma spraying; PVD, including EB-PVD, DVD, and cathodic arc deposition; CVD; slurry process deposition; sol-gel process deposition; electrophoretic deposition; or the like.

Bond coat 52 may define any thickness adequate to promote adherence of an additional layer to substrate 16. For example, bond coat 52 may have a thickness of less than about 0.008 inches (e.g., less than about 200 µm).

FIG. 2 shows an example article 50 that includes substrate 16, and multi-layer TBC 18 deposited on bond coat 52. In some examples, article 50 may or may not include all of the layers shown in FIG. 2, or article 50 may have one or more additional layers included, such as, for example, an EBC layer, an abradable coating, an outer CMAS-resistant layer, or the like.

Figure 3:
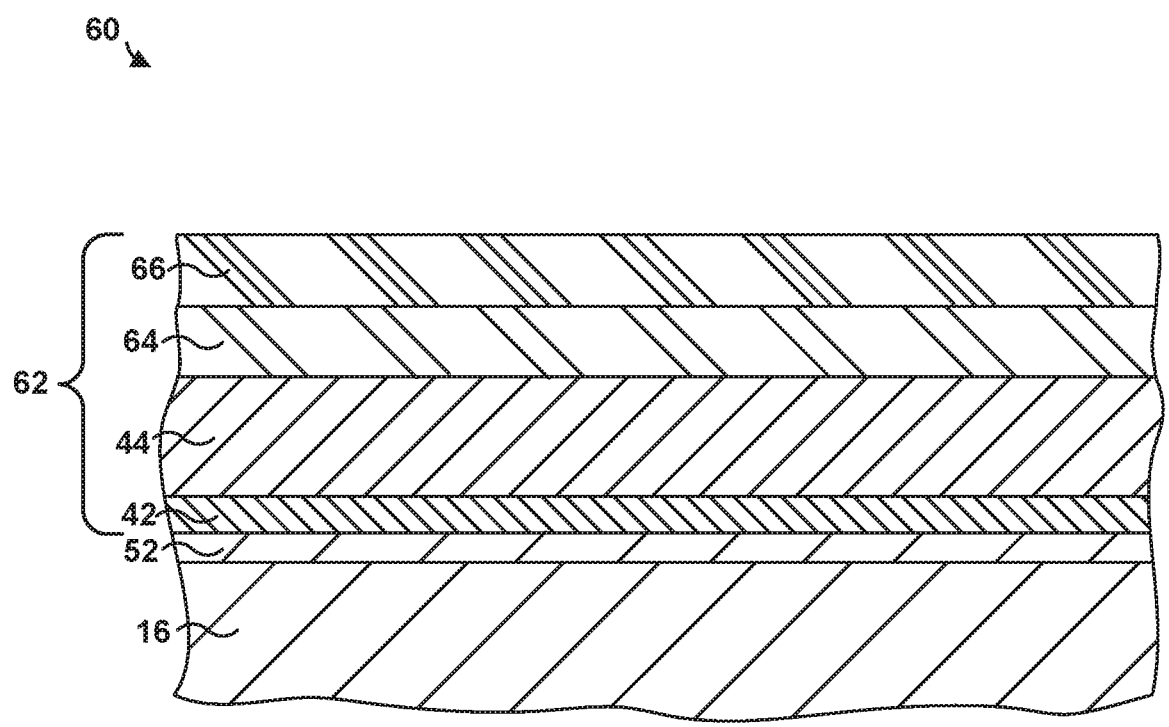
FIG. 3 is a cross-sectional diagram of another example article that includes a multi-layer TBC deposited on a substrate using a suspension thermal spray technique.

In some examples, the third layer 46 of TBC 18 may be separated into two different layers in order to further tailor the properties of third layer 46. For example, FIG. 3 is a cross-sectional diagram of another example article 80 that includes a multi-layer TBC 62 deposited on substrate 16 using a suspension thermal spray technique as described herein. Multi-layer TBC 62 includes first layer 42, second layer 44, third layer 64, and fourth layer 66. First layer 42 and second layer 44 may be the same as first layer 42 and second layer 44 described above with respect to FIG. 1B, the details of which will not be repeated here.

The composition of third layer 64 may be the same or substantially the same as third layer 46 from FIG. 1B that does not include added alumina. For example, third layer 64 may include predominately (e.g., the main component or a majority) the third based oxide (e.g., zirconia) mixed with a minority amounts of the second rare earth oxide (e.g., ytterbia), the third rare earth oxide (e.g., samaria), and the fifth rare earth oxide (e.g., gadolinia) deposited on second layer 44 as a dense microstructure. In some examples, third layer 64 may include a tetragonal prime phase constitution with about 2.5 mol. % ytterbia, about 1 mol. % gadolina, about 0.5 mol. % samaria, and the balance zirconia and any impurities present.

Third layer 64 may include a dense microstructure formed using the suspension plasma spray techniques described herein. The increased density of third layer 64 may help prevent exposure of substrate 16 to deleterious environmental species, prevent deterioration of multi-layer TBC 62, and increase the service life of substrate 16.

In some examples, third layer 64 may have a thickness of between about 0.0005 inches to about 0.005 inches (e.g., between about 10 µm to about 130 µm).

TBC 62 also includes fourth layer 66 on third layer 64. The composition of fourth layer 66 may be the same or substantially the same as third layer 46 from FIG. 1B that includes a phase constitution of alumina. For example, fourth layer 66 may include a fourth based oxide of zirconia or hafnia, the second rare earth oxide including ytterbia, the third rare earth oxide including samaria, and a sixth rare earth oxide including at least one of lutetia, scandia, ceria, neodymia, europia, and gadolinia (e.g., gadolinia) collectively forming a first phase and alumina forming a second phase. In some examples, the first phase of fourth layer 46 may include a tetragonal prime phase constitution with ytterbia in a concentration between about 2 mol. % and about 4 mol. % (e.g., about 2.5 mol. %), gadolinia in a concentration between about 0.1 mol. % and about 2 mol. % (e.g., about 1 mol. %), samaria in a concentration between about 0.1 mol. % and about 1 mol. % (e.g., about 0.5 mol. %), and the balance zirconia, and the second phase constitution of alumina. Fourth layer 66 may include between about 10 mol. % and about 50 mol. % of alumina based on the total layer. As described above, the presence of alumina may help increase the durability of fourth layer 66 and help protect multi-layer TBC 62 from erosion due to deleterious species, such as, for example, carbon and sand.

In some examples, fourth layer 66 may include a dense microstructure. The increased density of fourth layer 66 may help prevent exposure of substrate 16 to deleterious environmental species, prevent deterioration and erosion of multi-layer TBC 62, and increase the service life of substrate 16. In other examples, fourth layer 66 may include a columnar microstructure.

In some examples, fourth layer 66 may have a thickness between about 0.0005 inches and about 0.003 inches (e.g., between about 10 µm and about 80 µm).

Fourth layer 66 may be deposited using the suspension plasma spray techniques described herein. In other examples, fourth layer 66 may be deposited using other techniques including, for example, traditional thermal spraying, including, air plasma spraying, HVOF spraying, low vapor plasma spraying; PVD, including EB-PVD, DVD, and cathodic arc deposition; CVD; slurry process deposition; sol-gel process deposition; electrophoretic deposition; or the like to deposit fourth layer 66 including a dense microstructure or a columnar microstructure.

Figure 4:
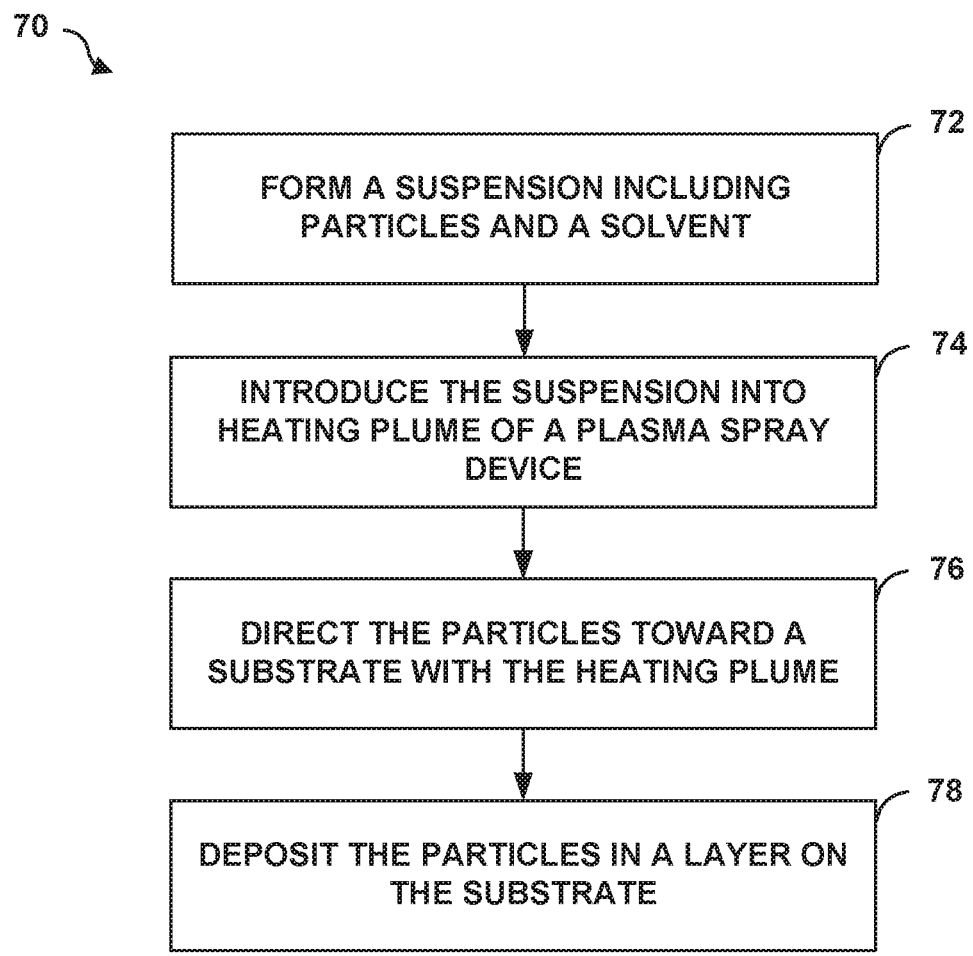
FIG. 4 is a flow diagram illustrating an example technique for depositing a layer on a substrate using suspension plasma spray.

FIG. 4 is a flow diagram illustrating an example technique 70 for depositing a layer on a substrate using suspension plasma spraying. The technique of FIG. 4 is described with respect to system 10 of FIG. 1A and second and third layers 44, 46 of article 40 of FIG. 1B for ease of description only. However, the suspension plasma spray techniques may be used to form other layers/articles of article 40 and the layers of TBC 18 of FIG. 1B may be formed using suspension plasma spray techniques other than those described in FIG. 4 or using other systems than those shown in FIG. 1A.

Technique 70 of FIG. 4 includes forming suspension 26 including coating material 28 and carrier 30 (72). Coating material 28 and carrier 30 may be substantially the same as those described above with respect to system 10 of FIG. 1A and article 40 of FIG. 1B. For example, with respect to forming second and third layers 44, 46, coating material 28 may include a respective base oxide (e.g., zirconia), the second rare earth oxide (e.g., ytterbia), the third rare earth oxide (e.g., samaria), and an additional rare earth oxide including at least one of lutetia, scandia, ceria, neodymia, europia, and gadoliniazirconia, ytterbia, gadolinia (e.g., gadolinia) mixed with a carrier 30. As described above, the respective amounts of each oxide may be tailored to formulate a cubic phase constitution (e.g., second layer 44), a tetragonal prime phase constitution (e.g., third layer 46), or a combination thereof depending on the desired properties of the layer. The particles may be pre-alloyed (e.g., particles of cubic or tetragonal prime phase constitutions of zirconia, ytterbia, gadolinia, and samaria) or provided as discrete particles of the different oxides mechanically mixed in suspension 26 in the desired compositional amounts.

In some examples, coating material 28 may have a fine particle size to facilitate melt softening or vaporization of coating material 28 by a heated plume (e.g., plasma) of plasma spray device 20. The average particle size of coating material 28 may be less than about 25 μm or less than about 10 μm, and in some cases, less than about 1 μm, depending on the desired microstructure of the resultant layer.

Altering the size of the particles of coating material 28, the spraying distance, power of plasma spray device 20, injection position, size of injection nozzle, surface speed, advance rate, target temperature, suspension feed rate, carrier 30 or combinations thereof may affect the microstructure, thickness, phase(s), and porosity of a deposited layer. For example, where a columnar microstructure is desired (e.g., second layer 44) the average particle diameter may be less than about 1 μm such as between about 0.01 μm and about 1 μm, between about 0.01 μm and about 0.5 μm, or between about 0.01 μm and about 0.05 μm. The very fine particles of coating material 28 may be deposited using the suspension plasma spray techniques described herein to form a layer with a columnar microstructure. For example, as one non-limiting example, the very fine particles may be applied using a relatively high spraying distance, a relatively high suspension feed rate, a relatively low power, or combinations thereof to obtain the columnar microstructure; however other parameters may also be used to obtain the columnar microstructure.

In other examples where a dense microstructure is preferred (e.g., third layer 46), the fine particles making up coating material 28 may have an average particle diameter between about 1 μm and about 25 μm, between about 1 μm and about 20 μm, between about 1 μm and about 10 μm, or between about 1 μm and about 5 μm. As one non-limiting example, the very fine particles may be applied using a relatively low spraying distance, a relatively low suspension feed rate, a relatively high power, or combinations thereof to obtain the dense microstructure; however other parameters may also be used to obtain the dense microstructure. Additionally, because the particles remain relatively small compared to the particle sizes utilized in other plasma spray techniques (e.g., >30 μm), the relatively small particle sizes of coating material 28 may result in the layer having a reduced pore size compared to a layer deposited using a traditional thermal spray technique, as the small particles will pack closer together.

Coating material 28 may be added to carrier 30 to form suspension 26. In some examples, suspension 26 may include may include about 1 to about 30 vol. % solid loading of coating material 28 in carrier 30. Suspension 26 may further include delivery aids such as a dispersant or a surfactant. The dispersant or surfactant may prevent coating material 28 from agglomerating in carrier 30 and maintain the suspension of coating material 28 in carrier 30.

Once suspension 26 is formed, suspension 26 may be introduced into a heated plume formed by plasma spray device 20 (74). For example, computing device 24 may control suspension source 22 to provide a controlled amount or rate of suspension 26 into the heated plume formed by plasma spray device 20.

Suspension 26 may be stored or supplied to plasma spray device 20 using suspension source 22. Computing device 24 may control suspension source 22 to introduce a controlled amount of suspension 26 into the heated plume formed by plasma spray device 20.

The temperature of the heated plume may, in some examples, be above about 6000 K, which may result in evaporation of substantially all (e.g., all or nearly all) of carrier 30. The evaporation of carrier 30 may leave substantially only coating material 28 in the heated plume. The high temperature of the heated plume may also result in melt softening or vaporization of coating material 28.

Technique 70 further includes directing coating material 28 toward substrate 16 using the heated plume (76). For example, computing device 24 may control a position of plasma spray device 20, stage 14, or both, to cause the heated plume to be directed at a selected location of substrate 16 to result in coating material 28 being deposited at the selected location. The heated plume may carry coating material 28 toward substrate 16, where coating material 28 deposits in a layer (e.g., second layer 44 or third layer 46) on substrate 16 (78).

In some examples, system 10 may include an inert gas source (not shown in FIG. 1A), and the inert gas source may supply an inert gas shroud to coating material 28 in the heated plume during deposition of coating material 28 on substrate 16. The inert gas may surround the heated plume as the heated plume exits plasma spray device 20. The inert gas shroud may reduce in-air oxidation of coating material 28. In-air oxidation may cause the resulting multi-layer TBC 18 to have reduced density, cohesive strength, bond strength, or the like. The inert gas used for the inert gas shroud may include Ar, $N_2$, or the like.

In some examples, while directing coating material 28 toward substrate 16 using the heated plume (76), computing device 24 may control plasma spray device 20, stage 14, or both to move plasma spray device 20 and substrate 16 relative to each other. For example, computing device 24 may be configured to control plasma spray device 20 to scan the heated plume relative to substrate 16. This may cause the cylinder-shaped heated plume that includes coating material 28 to move relative to substrate 16, and may form a layer of multi-layer TBC 18 over the surfaces of substrate 16 scanned with the heated plume.

Figure 5:
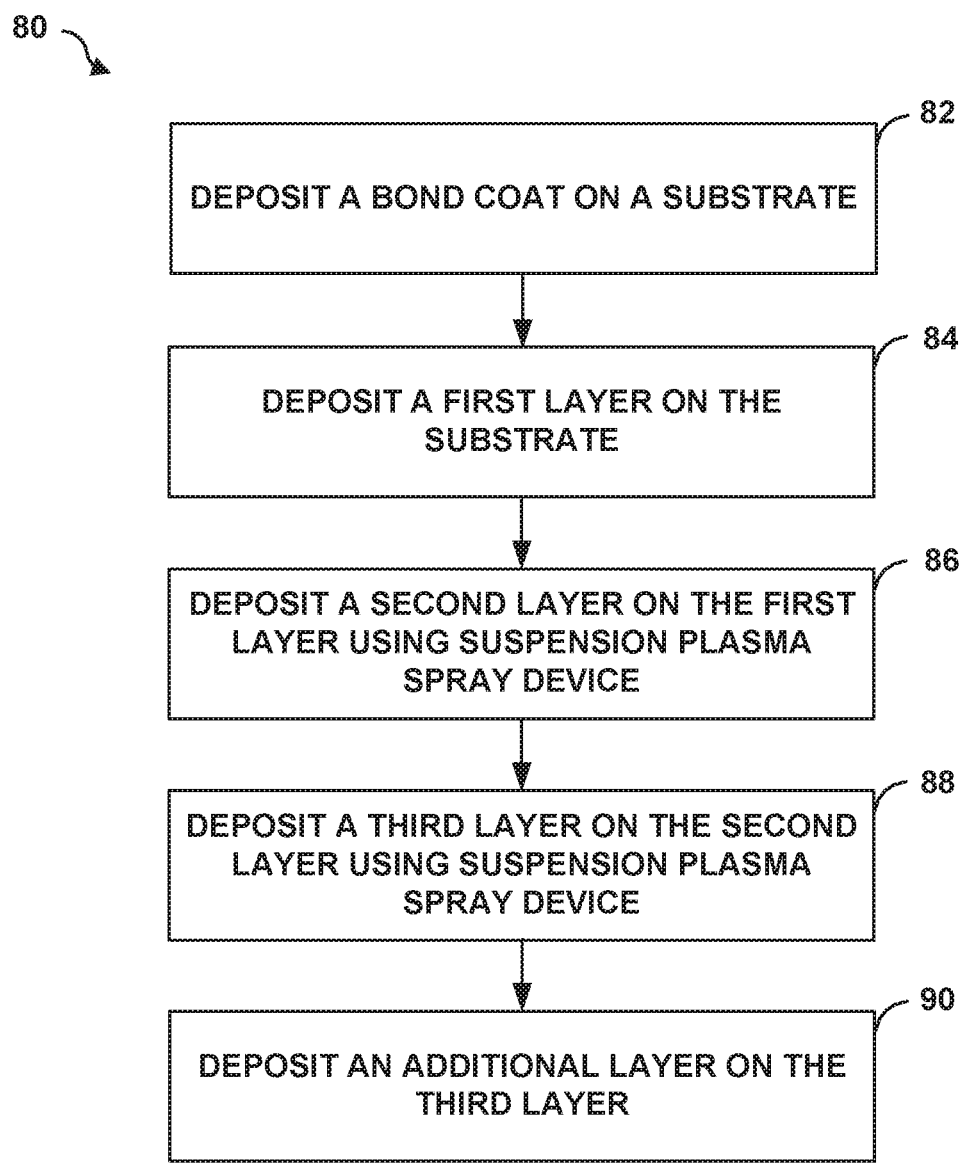
FIG. 5 is a flow diagram illustrating an example technique for depositing a multi-layer TBC on a substrate using a suspension plasma spray technique.

FIG. 5 is a flow diagram illustrating an example technique 80 for depositing a multi-layer TBC on a substrate using a suspension plasma spray technique as described herein. The technique of FIG. 5 is described with respect to articles 40, 50, and 60 of FIGS. 1B-3 for ease of description only. A person having ordinary skill in the art will recognize and appreciate that the technique of FIG. 5 may be used to form articles other than those of FIGS. 1B-3, and the articles of FIGS. 1B-3 may be formed using other suspension plasma spray techniques than those described in FIG. 5.

Technique 80 includes depositing an optional bond coat 52 on substrate 16 (82), depositing first layer 42 on substrate 16 (84), depositing second layer 44 on first layer 42 using plasma spray device 20 (86), and depositing third layer 46 on second layer 44 using plasma spray device 20 (88).

The composition of bond coat 52 may be tailored depending on the composition of underlying substrate 16 in order to improve adhesion between multi-layer TBC 18 and substrate 16 and may be substantially the same as described above with respect to FIG. 2. For example, where substrate 16 includes a super alloy material, bond coat 52 may include an alloy, such as a MCrAlY alloy or may include Pt. In other examples where substrate 16 includes a ceramic or CMC, bond coat 52 may include ceramics.

In some examples, bond coat 52 may be deposited on substrate 16 using a suspension plasma spray technique, e.g., technique 70 of FIG. 4. In other examples, the bond coat may be applied using other techniques including, for example, traditional thermal spraying, including, air plasma spraying, HVOF spraying, low vapor plasma spraying; PVD, including EB-PVD, DVD, and cathodic arc deposition; CVD; slurry process deposition; sol-gel process deposition; electrophoretic deposition; or the like.

Technique 80 includes also depositing first layer 42 of multi-layer TBC 18 on substrate 16 (84). First layer 42 may be substantially the same as first layer 42 described above with respect to article 40 of FIG. 1. For example, first layer 42 may include zirconia and yttria deposited in a columnar microstructure to provide multi-layer TBC 18 with enhanced thermal cycling resistance and bonding to underlying substrate 16.

First layer 42 may be deposited using a first plurality of particles using the suspension plasma spray techniques of the present disclosure, e.g., technique 70 of FIG. 1. The first plurality of particles may include a single particle type, e.g., a pre-alloyed zirconia and yttria particles, or may include discrete particles of zirconia and yttria. In some examples, the first plurality of particles may have an average diameter less than about 1 μm and may be deposited in a predominately columnar microstructure.

Technique 80 further includes depositing second layer 44 in a columnar microstructure on first layer 42 (86). Second layer 44 may be substantially the same as second layer 44 described with respect to FIG. 1B. For example, second layer 44 may include zirconia, ytterbia, gadolinia, and samaria deposited in a columnar microstructure to provide multi-layer TBC 18 with a low thermal conductivity.

Second layer 44 may be deposited using a second plurality of particles using the suspension plasma spray techniques described herein, e.g., technique 70 of FIG. 4. In some examples, the second plurality of particles may include a single particle type, e.g., a pre-alloyed zirconia, ytterbia, gadolinia, and samaria particles. The pre-alloyed particles may include or substantially include pre-alloyed particles in a desired phase constitution. For example, the second plurality of particles may include zirconia, ytterbia, gadolinia, and samaria including or substantially including a cubic phase constitution. In other examples, the second plurality of particles may include discrete particles, e.g., distinct particles of each of zirconia, ytterbia, gadolinia, and samaria combined to make up the composition of second layer 44 with the desired phase constitution. In some examples, depositing second layer 44 as a cubic phase constitution may provide second layer 44 with a lower thermal conductivity than a layer having a similar composition with a tetragonal prime or a compound phase constitution.

In some examples, the second plurality of particles may define an average particle size less than about 1 μm which may aid in depositing second layer 44 as a columnar microstructure. The columnar microstructure of second layer 44 may provide improved thermal cycling performance in comparison to layers that do not possess a columnar microstructure.

Technique 80 also includes depositing third layer 46, in a dense microstructure on second layer 44 (88). Third layer 46 may be substantially the same as third layer 46 described with respect to FIG. 1B. For example, third layer 46 may include zirconia, ytterbia, gadolinia, samaria, and optionally, alumina, in a dense microstructure to help prevent exposure of substrate 16 to deleterious environmental species, prevent deterioration and erosion of multi-layer TBC 18, and increase the durability and service life of substrate 16.

Third layer 46 may be deposited using a third plurality of particles using the suspension plasma spray techniques described herein, e.g., technique 70 of FIG. 4. In some examples, the third plurality of particles may include a single particle type, e.g., a pre-alloyed zirconia, ytterbia, gadolinia, and samaria particles. The pre-alloyed particles may include or substantially include pre-alloyed particles in a desired phase constitution. For example, the third plurality of particles may include zirconia, ytterbia, gadolinia, and samaria including or substantially including a tetragonal prime phase constitution. In other examples, the third plurality of particles may include discrete particles, e.g., distinct particles of each of zirconia, ytterbia, gadolinia, and samaria combined to make up the composition of third layer 46 with the desired phase constitution. In some examples, depositing third layer 46 as a tetragonal prime phase constitution may provide third layer 46 with improved thermal cycling resistance than a layer having a similar composition with a cubic or a compound phase constitution.

In some examples, the third plurality of particles may define an average particle size between about 1 μm and about 25 μm which may aid in depositing third layer 46 with a dense microstructure. The dense microstructure of third layer 46 may provide a decreased overall porosity and resultant higher density in comparison to layers that do not possess a dense microstructure.

Technique 80 also includes optionally depositing one or more additional layers on multi-layer TBC 18 (90). In some examples, the additional layer be the same or substantially the same as fourth layer 66 of FIG. 3. For example, fourth layer 66 may include a first phase constitution of the fourth base oxide (e.g., zirconia), the second rare earth oxide (e.g., ytterbia), the third rare earth oxide (e.g., samaria), and the sixth rare earth oxide (e.g., gadolinia) collectively, for example, in a tetragonal prime phase constitution and a second phase of alumina as described with respect to FIG. 3, where the alumina phase makes up about 10% to about 50% of the layer. In some examples, fourth layer 66 may be deposited over a third layer 64 that does not include alumina. The presence of alumina in fourth layer 66 may increase the overall durability of article 60 compared to an outer layer on article 60 that does not include alumina.

Fourth layer 66 may be deposited using a fourth plurality of particles (e.g., particles of alumina mixed with particles of the first phase constitution of zirconia, ytterbia, gadolinia, samaria) and a suspension plasma spray technique, e.g., technique 70 from FIG. 4. In other examples, fourth layer 66 may be applied using other techniques including, for example, traditional thermal spraying, including, air plasma spraying, HVOF spraying, low vapor plasma spraying; PVD, including EB-PVD, DVD, and cathodic arc deposition; CVD; slurry process deposition; sol-gel process deposition; electrophoretic deposition; or the like.

In some examples, fourth layer 66 may be deposited as a dense microstructure, a columnar microstructure, or a porous microstructure to provide desired properties. For example, fourth layer 66 may be deposited in a columnar microstructure to provide enhanced thermal cycling resistance, or fourth layer 66 may be deposited in a dense microstructure to provide enhanced erosion resistance and durability.

In some examples, one or more additional layers may be deposited on third layer 46 or fourth layer 66 including, for example, other protective or functional layers, such as, for example, an EBC layer, an abradable coating, a CMAS-resistant layer, or the like.

Various examples have been described. These and other examples are within the scope of the following claims.

What is claimed is:

1. A method comprising:
   depositing a first plurality of particles on a substrate to form a first layer, wherein the first plurality of particles comprises a first base oxide comprising zirconia or hafnia and a first rare earth oxide comprising yttria, wherein the first layer comprises a columnar microstructure;
   depositing a second plurality of particles directly on the first layer using a suspension plasma spray technique to form a second layer, wherein the second plurality of particles comprises a second base oxide comprising zirconia or hafnia, a second rare earth oxide comprising ytterbia, a third rare earth oxide comprising samaria, and a fourth rare earth oxide comprising at least one of lutetia, scandia, ceria, neodymia, europia, and gadolinia, wherein the second layer comprises a columnar microstructure, wherein a coefficient of thermal expansion (CTE) of the second layer is higher than the CTE of the first layer; and
   depositing a third plurality of particles using a suspension plasma spray technique to form a third layer on the second layer, wherein the third plurality of particles comprises a third base oxide comprising zirconia or hafnia, the second rare earth oxide, the third rare earth oxide, and a fifth rare earth oxide comprising at least one of lutetia, scandia, ceria, neodymia, europia, and gadolinia, wherein the third layer has a dense microstructure, and wherein a porosity of the third layer is lower than a porosity of the second layer.

2. The method of claim 1, further comprising depositing a bond coat on the substrate, wherein the bond coat comprises at least one of Pt or MCrAlY, wherein M is Ni, Co, or NiCo, and wherein depositing the first plurality of particles comprises depositing the first plurality of particles on the bond coat.

3. The method of claim 1, wherein the third plurality of particles further comprises alumina.

4. The method of claim 1, further comprising depositing a fourth plurality of particles on the third layer to form a fourth layer, wherein the fourth plurality of particles comprises a fourth base oxide comprising zirconia or hafnia, alumina, the second rare earth oxide comprising ytterbia, the third rare earth oxide, and a sixth rare earth oxide comprising at least one of lutetia, scandia, ceria, neodymia, europia, and gadolinia, wherein the fourth layer comprises at least one of a dense microstructure or a columnar microstructure.

5. The method of claim 1, wherein at least one of the first, second, or third plurality of particles defines an average diameter of about 1 μm or less.

6. The method of claim 1, wherein the second plurality of particles comprises pre-alloyed particles, wherein the pre-alloyed particles comprise a cubic phase constitution.

7. The method of claim 1, wherein the second plurality of particles comprises first particles comprising zirconia, second particles comprising ytterbia, third particles comprising samaria, and fourth particles comprising gadolinia.

8. The method of claim 7, wherein once deposited, the second layer comprises a cubic phase constitution.

9. The method of claim 1, wherein the third plurality of particles comprises pre-alloyed particles, wherein the pre-alloyed particles comprise a tetragonal prime phase constitution.

10. The method of claim 1, wherein the third plurality of particles comprises first particles comprising zirconia, second particles comprising ytterbia, third particles comprising samaria, and fourth particles comprising gadolinia.

11. The method of claim 10, wherein once deposited, the third layer comprises a tetragonal prime phase constitution.

12. The method of claim 9, wherein depositing the second plurality of particles or depositing the third plurality of particles comprises:
   forming a suspension including a respective set of particles and a solvent;
   introducing the suspension into a heating plume of a plasma spray device;
   directing the respective set of particles in the suspension toward the substrate with the heating plume; and
   depositing the respective set of particles to form a layer.

13. The method of claim 1, wherein the dense microstructure of the third layer is less than fully dense.

14. The method of claim 1, wherein the porosity of the third layer is greater than about five percent by volume (vol. %).

15. The method of claim 1, wherein an average diameter of pores in the third layer is from about 1 μm to about 10 μm.

16. The method of claim 1,
   wherein an average diameter of the second plurality of particles is less than about 1 μm, and
   wherein an average diameter of the third plurality of particles is from about 1 μm to about 25 μm.

* * * * *